(12) United States Patent
Seo et al.

(10) Patent No.: US 10,917,688 B2
(45) Date of Patent: *Feb. 9, 2021

(54) VIDEO CONTENT PROVIDING APPARATUS, CONTROL METHOD THEREOF AND SYSTEM

(71) Applicant: SAMSUNG ELECTRONICS CO., LTD., Suwon-si (KR)

(72) Inventors: Young-jo Seo, Hwaseong-si (KR); Sung-bo Oh, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/657,795

(22) Filed: Oct. 18, 2019

(65) Prior Publication Data

US 2020/0053423 A1  Feb. 13, 2020

Related U.S. Application Data

(63) Continuation of application No. 16/010,708, filed on Jun. 18, 2018, now Pat. No. 10,499,106, which is a (Continued)

(30) Foreign Application Priority Data

Jan. 6, 2016 (KR) .......................... 10-2016-0001734

(51) Int. Cl.
*H04N 7/173* (2011.01)
*H04N 21/4402* (2011.01)
(Continued)

(52) U.S. Cl.
CPC . *H04N 21/44029* (2013.01); *H04N 21/43635* (2013.01); *H04N 21/440218* (2013.01);
(Continued)

(58) Field of Classification Search
CPC ....... H04N 21/44029; H04N 21/43635; H04N 21/440218; H04N 21/440263; H04N 21/440281; H04N 21/63
See application file for complete search history.

(56) References Cited

U.S. PATENT DOCUMENTS 9,467,704 B2  10/2016  Ten
10,021,453 B2  7/2018  Seo et al.
(Continued)

FOREIGN PATENT DOCUMENTS

CN  101129069  2/2008
CN  102377990  3/2012
(Continued)

OTHER PUBLICATIONS

U.S. Appl. No. 15/394,907, filed Dec. 30, 2016; Seo et al.
(Continued)

*Primary Examiner* — John R Schnurr
(74) *Attorney, Agent, or Firm* — Nixon & Vanderhye, P.C.

(57) ABSTRACT

An example video content apparatus including: an output portion including output circuitry configured to transmit a content signal for displaying an image to a relay connected to an image processing apparatus to provide the content signal to the image processing apparatus; and at least one processor configured to receive video formation information about a first video format supported by the image processing apparatus from among a plurality of video formats from the relay, and if it is determined that the relay does not support the first video format, to output the content signal corresponding to a second video format different from the first video format and supportable by the relay from among the plurality of video formats.

23 Claims, 27 Drawing Sheets

Related U.S. Application Data continuation of application No. 15/394,907, filed on Dec. 30, 2016, now Pat. No. 10,021,453.

(51) Int. Cl.
 *H04N 21/4363* (2011.01)
 *H04N 21/63* (2011.01)

(52) U.S. Cl.
 CPC ........... *H04N 21/440263* (2013.01); *H04N 21/440281* (2013.01); *H04N 21/63* (2013.01)

(56) References Cited

U.S. PATENT DOCUMENTS

| | | |
|---|---|---|
| 2008/0080596 A1 | 4/2008 | Inoue |
| 2012/0033129 A1 | 2/2012 | Miura |
| 2012/0047281 A1 | 2/2012 | Lee et al. |
| 2012/0090001 A1 | 4/2012 | Yen |
| 2014/0143815 A1 | 5/2014 | Eguchi et al. |
| 2014/0232939 A1 | 8/2014 | Kabuto |
| 2015/0288919 A1 | 10/2015 | Labosco et al. |
| 2017/0006336 A1 | 1/2017 | Lee et al. |

FOREIGN PATENT DOCUMENTS

| | | |
|---|---|---|
| CN | 104125414 | 10/2014 |
| CN | 104837052 | 8/2015 |
| KR | 10-2015-0029606 | 3/2015 |
| WO | WO 2015/137716 | 9/2015 |

OTHER PUBLICATIONS

Search Report dated Apr. 11, 2017 in counterpart International Patent Application No. PCT/KR2016/015444.
U.S. Appl. No. 16/010,708, filed Jun. 18, 2018, Seo et al.
First Office Action dated Jan. 10, 2020 in counterpart Chinese Patent Application No. 201680042157.8 and English-language translation.
Second Office Action dated Sep. 3, 2020 in counterpart Chinese Patent Application No. 201680042157.8 and English-language translation.

FIG. 11

| Byte # | 7 | 6 | 5 | 4 | 3 | 2 | 1 | 0 |
|---|---|---|---|---|---|---|---|---|
| 0 | Vender-specific tag code (=3) | | | | Length (=N) | | | |
| 1 | 24-bit IEEE Registration identifier (0x000C03) | | | | | | | |
| 2 | (least significant byte first) | | | | | | | |
| 3 | | | | | | | | |
| 4 | A | | | | B | | | |
| 5 | C | | | | D | | | |
| 6 | Supports_AI | DC_48bit | DC_36bit | DC_30bit | DC_Y444 | Rsvd (0) | Rsvd (0) | DVI_Dual |
| 7 | MAX_TMDS_Clock | | | | | | | |

710, 711, extension fields

FIG. 12

| Byte\Bit# | 7 | 6 | 5 | 4 | 3 | 2 | 1 | 0 |
|---|---|---|---|---|---|---|---|---|
| 0 | Vender-specific tag code (=3) | | | | Length (=N) | | | |
| 1 | IEEE OUI, Third Octet (0xD8) | | | | | | | |
| 2 | IEEE OUI, Second Octet (0x5D) | | | | | | | |
| 3 | IEEE OUI, First Octet (0xC4) | | | | | | | |
| 4 | Version (=1) | | | | | | | |
| 5 | Max_TMDS_Character_Rate | | | | | | | |
| 6 | SCDC_Present | RR_Capable | Rsvd(0) | Rsvd(0) | LTE_340Mcsc_scramble | Independent_view | Dual_View | 3D_OSD_Disparity |

| Offset | Bit 7 | Bit 6 | Bit 5 | Bit 4 | Bit 3 | Bit 2 | Bit 1 | Bit 0 |
|---|---|---|---|---|---|---|---|---|
| 0x01 | | | | Sink Version (1) | | | | |

750

| Offset | Bit 7 | Bit 6 | Bit 5 | Bit 4 | Bit 3 | Bit 2 | Bit 1 | Bit 0 |
|---|---|---|---|---|---|---|---|---|
| 0x21 | Rsvd (0) | Rsvd (0) | Rsvd (0) | Rsvd (0) | Rsvd (0) | Rsvd (0) | Rsvd (0) | Scrambling_status |

760

| Offset | Bit 7 | Bit 6 | Bit 5 | Bit 4 | Bit 3 | Bit 2 | Bit 1 | Bit 0 |
|---|---|---|---|---|---|---|---|---|
| 0x40 | Rsvd (0) | Rsvd (0) | Rsvd (0) | Rsvd (0) | ch2_Locked | ch1_Locked | ch0_Locked | Clock_Detected |
| 0x41 | Rsvd (0) | Rsvd (0) | Rsvd (0) | Rsvd (0) | Rsvd (0) | Rsvd (0) | Rsvd (0) | Rsvd (0) |

FIG. 16

| Offset (hex) | Name | Size in Bytes | Rd/Wr | Function |
|---|---|---|---|---|
| 0x00 | HDCP1.4 | 68 | Rd/Wr | Reserved for use as specified in HDCP1.4 |
| 0x44 | Rsvd | 12 | Rd | All bytes read as 0x00 |
| 0x50 | HDCP2Version | 1 | Rd | While HPD is asserted, the HDCP Receiver must maintain a valid value for HDCP2Version available for reading by the Transmitter. Bits 7-3:Reserved (must be zero) Bits 2:When set to one, this HDCP Receiver supports HDCP2.2. Bits 1-0:Reserved (must be zero) |
| 0x51 | Rsvd | 15 | Rd | All bytes read as 0x00 |
| 0x60 | Write_Message | 1 | Wr | The HDCP Transmitter performs write of a variable length message to the HDCP Receiver as a single burst write to this address. Note, there is no auto_increment of the I-C offset address. |
| 0x61 | Rsvd | 15 | Rd | All bytes read as 0x00 |

VIDEO CONTENT PROVIDING APPARATUS, CONTROL METHOD THEREOF AND SYSTEM

CROSS-REFERENCE TO RELATED APPLICATIONS

This application is a continuation of U.S. application Ser. No. 16/010,708, filed on Jun. 18, 2018, now U.S. Pat. No. 10,499,106, which is a continuation of U.S. application Ser. No. 15/394,907, filed on Dec. 30, 2016, now U.S. Pat. No. 10,021,453, which claims priority to Korean Patent Application No. 10-2016-0001734, filed Jan. 6, 2016. The contents of each of these applications are incorporated herein in their entirety.

BACKGROUND

Field

The present disclosure relates generally to a video content providing apparatus for providing video content to be displayed as an image on various display apparatus such as a television (TV), a monitor, etc., a control method thereof, and a system, and for example, to a video content providing apparatus, which has an improved structure to prevent and/or reduce an image display program caused by a mismatch of support video interface between a relay and a display apparatus when video content is provided to the display apparatus not directly but via the like relay such as an audio/video (AV) receiver, a control method thereof and a system.

Description of Related Art

To compute and process predetermined information in accordance with certain processes, an electronic apparatus basically includes a central processing unit (CPU), a chipset, a memory, and the like electronic components for computation. Such an electronic apparatus may be classified variously in accordance with what information will be processed therein. For example, the electronic apparatus is classified into an information processing apparatus such as a personal computer, a server or the like for processing general information, and an image processing apparatus for processing image information.

The image processing apparatus receives a content signal including image data from the exterior and processes the image data extracted from the content signal in accordance with various image processing processes. The image processing apparatus may display an image based on the processed image data on its own display panel, or output the processed image data to another display apparatus provided with a panel so that on the corresponding display apparatus can display an image based on the processed image signal. In particular, the image processing apparatus that has a display panel is called a display apparatus, and may for example includes a TV, a monitor, a portable multimedia player (PMP), a tablet computer, a mobile phone, etc. Further, the image processing apparatus includes an apparatus for providing video data to another image processing apparatus such as a TV, which is called a video content providing apparatus, a video providing apparatus, etc. As an example of the video content providing apparatus, there is an ultrahigh definition (UHD) player. For example, video content reproduced in a UHD player is provided to the TV in accordance with preset interface standards, and then displayed as an image on the TV.

The video content providing apparatus is directly connected to another image processing apparatus and provides content without any separate device. However, due to various environmental reasons, convenience of use, etc., there may be a structure where video content is primarily transferred from the video content providing apparatus the relay and then secondarily transferred from the relay to one or more display apparatuses. The relay not only transfers the video content to the display apparatus but also performs various processes with respect to video content. Such a process may for example include authentication for security of video content, scrambling, descrambling, etc.

To make the display apparatus display an image with the best quality, the video content providing apparatus may output video content with the highest quality supportable in the display apparatus. However, if there is a mismatch in ability to process video content between the relay and the display apparatus, video content may be not normally transferred from the relay to the display apparatus or not transferred at all. As a result, the display apparatus cannot normally display an image in this case. Therefore, it is important to overcome the mismatch and assure normal display of video content.

SUMMARY

A video content providing apparatus is provided, the video content providing apparatus including: an output portion comprising output circuitry configured to transmit a content signal for displaying an image to a relay connected to an image processing apparatus to provide the content signal to the image processing apparatus; and at least one processor configured to receive video formation information about a first video format supported by the image processing apparatus among a plurality of video formats from the relay, and if it is determined that the relay does not support the first video format, to output the content signal corresponding to a second video format different from the first video format and supportable by the relay, among the plurality of video formats. Thus, even if the relay does not support the first video format, it is possible to prevent and/or avoid a situation in which the image processing apparatus cannot display an image based on a content signal.

The plurality of video formats may be different in image quality from one another. Thus, if the relay does not support the first video format, the image processing apparatus can display an image based on the second video format instead of the first video format.

The image quality may depend on at least one of a resolution and frames per second.

The content signal may be transmitted in accordance with preset interface standards, and the at least one processor may determine that the relay supports the first video format if the relay supports preset first-version interface standards, and determines that the relay does not support the first video format if the relay does not support the preset first-version interface standards. Thus, it is easy to determine whether the video format of the content signal is supported.

The at least one processor may transmit a command based on the first-version interface standard to the relay, and may determine that the relay supports the first-version interface standards if a reply to the command is received from the relay within a preset period of time, but determines that the relay does not support the first-version interface standards if a reply to the command is not received from the relay within the preset period of time.

The at least one processor may access a preset address designated in the first-version interface standards of the relay to determine whether data designated corresponding to the address is acquirable, and may determine that the relay supports the first-version interface standards if the data is acquirable, but may determine that the relay does not support the first-version interface standards if the data is not acquirable.

The interface standards may include high definition multimedia interface (HDMI).

The first-version interface standards may include HDMI 2.0.

The at least one processor may determine that the relay supports HDMI 2.0 if the relay can perform communication using a status and control data channel (SCDC), but may determine that the relay does not support HDMI 2.0 if the relay cannot perform communication using the SCDC.

The interface standards may include high-bandwidth digital content protection (HDCP).

The first-version interface standards may include HDCP 2.2.

The at least one processor may communicate with the relay based on the interface standards through a cable for connecting the output portion and the relay.

The output portion may be configured to wirelessly communicate with the relay, and the at least one processor may wirelessly communicate with the relay based on the interface standards.

The video format information may include extended display identification data (EDID) received from the image processing apparatus and stored in the relay, and the at least one processor may acquire the EDID from the relay.

The at least one processor may output the content signal corresponding to the first video format if it is determined that the relay supports the first video format. Thus, if it is determined that the relay supports the first video format, the image processing apparatus can display an image based on the first video format.

A method of controlling a video content providing apparatus is provided, the method including: receiving video formation information about a first video format supported by an image processing apparatus among a plurality of video formats from a relay connected to the image processing apparatus; determining whether the relay supports the first video format; generating a content signal corresponding to a second video format different from the first video format and supportable by the relay, among the plurality of video formats if it is determined that the relay does not support the first video format; and transmitting a content signal for displaying an image to the relay to provide the content signal to the image processing apparatus. Thus, even if the relay does not support the first video format, it is possible to prevent and/or avoid a situation in which the image processing apparatus cannot display an image based on a content signal.

A system is provided, the system including: a video content providing apparatus configured to provide a content signal; an image processing apparatus configured to display an image based on the content signal; and a relay configured to relay the content signal from the video content providing apparatus to the image processing apparatus, the video content providing apparatus including: an output portion comprising output circuitry configured to transmit the content signal to the relay; at least one processor configured to receive video formation information about a first video format supported by the image processing apparatus among a plurality of video formats from the relay, and if it is determined that the relay does not support the first video format, to output the content signal corresponding to a second video format different from the first video format and supportable by the relay, among the plurality of video formats. Thus, even if the relay does not support the first video format, it is possible to prevent and/or avoid a situation in which the image processing apparatus cannot display an image based on a content signal.

The at least one processor may output the content signal corresponding to the first video format if it is determined that the relay supports the first video format. Thus, if the relay does not support the first video format, the image processing apparatus can display an image based on the second video format instead of the first video format.

The relay may store the video format information received from the image processing apparatus, and may transmit the stored video format information to the video content providing apparatus.

BRIEF DESCRIPTION OF THE DRAWINGS

The above and/or other aspects and attendant advantages of the present disclosure will become apparent and more readily appreciated from the following detailed description, taken in conjunction with the accompanying drawings, in which like reference numerals refer to like elements, and wherein:

FIG. 11 is a diagram illustrating an example of a part of HDMI forum vendor-specific data block (HF-VSDB) in HDMI 1.4 applied to a system according to a fourth example embodiment;

FIG. 12 is a diagram illustrating an example of a part of HF-VSDB in HDMI 2.0 applied to the system according to the fourth example embodiment;

FIG. 14 is a diagram illustrating an example of a field of 0x01 bytes, a field of 0x21 bytes and a field of 0x40 and 0x41 bytes in a status and control data channel (SCDC) structure of HDMI 2.0 applied to a system according to a fifth example embodiment;

FIG. 16 is a diagram illustrating an example of a part of an address map applied to the HDCP according to the fifth example embodiment;

DETAILED DESCRIPTION

Below, various example embodiments will be described in greater detail with reference to accompanying drawings. The following descriptions of the example embodiments are made by referring to elements illustrated in the accompanying drawings, in which like numerals refer to like elements having substantively the same functions.

In the description of the example embodiments, an ordinal number used in terms such as a first element, a second element, etc. is employed for describing variety of elements, and the terms are used for distinguishing between one element and another element. Therefore, the meanings of the elements are not limited by the terms, and the terms are also used just for explaining the corresponding embodiment without limiting the idea of the disclosure.

Further, the example embodiments may describe only elements directly related to the idea of the disclosure, and description of the other elements may be omitted. However, it will be appreciated that the elements, the descriptions of which are omitted, are not unnecessary to realize the apparatus or system according to the example embodiments. In the following descriptions, terms such as "include" or "have" refer to presence of features, numbers, steps, operations, elements or combination thereof, and do not exclude presence or addition of one or more other features, numbers, steps, operations, elements or combination thereof.

Further, the example embodiments respectively described with reference to the accompanying drawings are not exclusive to each other unless otherwise mentioned, and a plurality of embodiments may be selectively combined within one apparatus. The combination of these plural embodiments may be discretionally selected and applied to realize the present disclosure by a person having an ordinary skill in the art.

Figure 1:
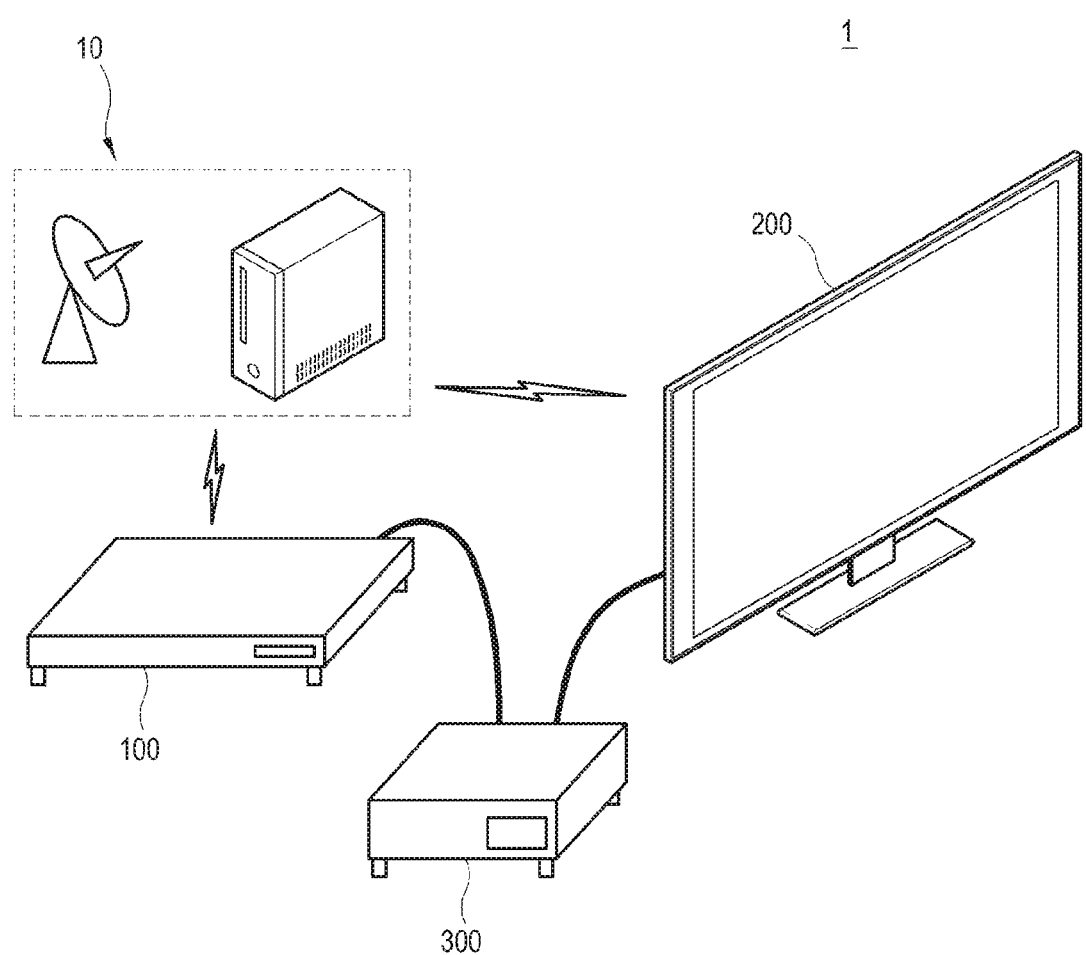
FIG. 1 is a diagram illustrating an example system according to a first example embodiment.

FIG. 1 is a diagram illustrating an example system 1 according to a first example embodiment.

As illustrated in FIG. 1, the system 1 according to the first example embodiment includes a video content providing apparatus 100 that outputs a video signal about video content, a display apparatus 200 that displays an image by processing the video signal output from the video content providing apparatus 100, and an AV receiver 300 that relays a video signal from the video content providing apparatus 100 to the display apparatus 200. The video content providing apparatus 100 and the display apparatus 200 are one-to-one connected to the AV receiver 300 by a cable, so that a video signal can be transferred from the video content providing apparatus 100 to the AV receiver 300 through the cable and transferred from the AV receiver 300 to the display apparatus 200. The video content providing apparatus 100, the display apparatus 200 and the AV receiver 300 support common video interface standards so that a video signal provided by the video content providing apparatus 100 can be processed in the display apparatus 200.

The video content providing apparatus 100 reproduces video content stored therein or receives video content from another external video source 10. The name of the video content providing apparatus 100 is derived for convenience from an operation performed by the image processing apparatus in this example embodiment, e.g., from a function of providing video content to the display apparatus 200. Therefore, the video content providing apparatus 100 may be achieved without any limitation. For example, the video content providing apparatus 100 may be variously achieved by a player of an optical medium such as a digital versatile disc (DVD) or Blu-ray; a UHD player; a set-top box; a TV; a computer; a mobile device; a home theater system; or the like, but is not limited thereto.

The display apparatus 200 may be variously achieved by a monitor, a portable multimedia player, a mobile phone, a tablet computer, an electronic frame, an electronic blackboard, an electronic billboard, or the like, but is not limited thereto, as well as the TV. In this example embodiment, the TV is used as the display apparatus 200 and receives video content from the video content providing apparatus 100, but not limited thereto. Alternatively, the apparatus for receiving video content may be achieved by not only various display apparatuses 200 but also an image processing apparatus that cannot display an image by itself.

The display apparatus 200 receives video content from not only the video content providing apparatus 100 but also a separate video source 10. Further, the display apparatus 200 may be directly connected to the video content providing apparatus 100 without the AV receiver 300, and directly receive a video signal from the video content providing apparatus 100. Further, the method of transmitting a video signal is not limited to the cable. Besides the cable, various methods may be used in transmitting a video signal. However, this example embodiment will be described focusing on a system 1 where the AV receiver 300 relays video content from the video content providing apparatus 100 to the display apparatus 200 and a video signal is transmitted through the cable.

Below, elements of the video content providing apparatus 100 will be described with reference to FIG. 2. For convenience, the video content providing apparatus 100 will be called a source device in terms of providing video content, and the display apparatus 200 will be called a sink device in terms of receiving the video content.

Figure 2:
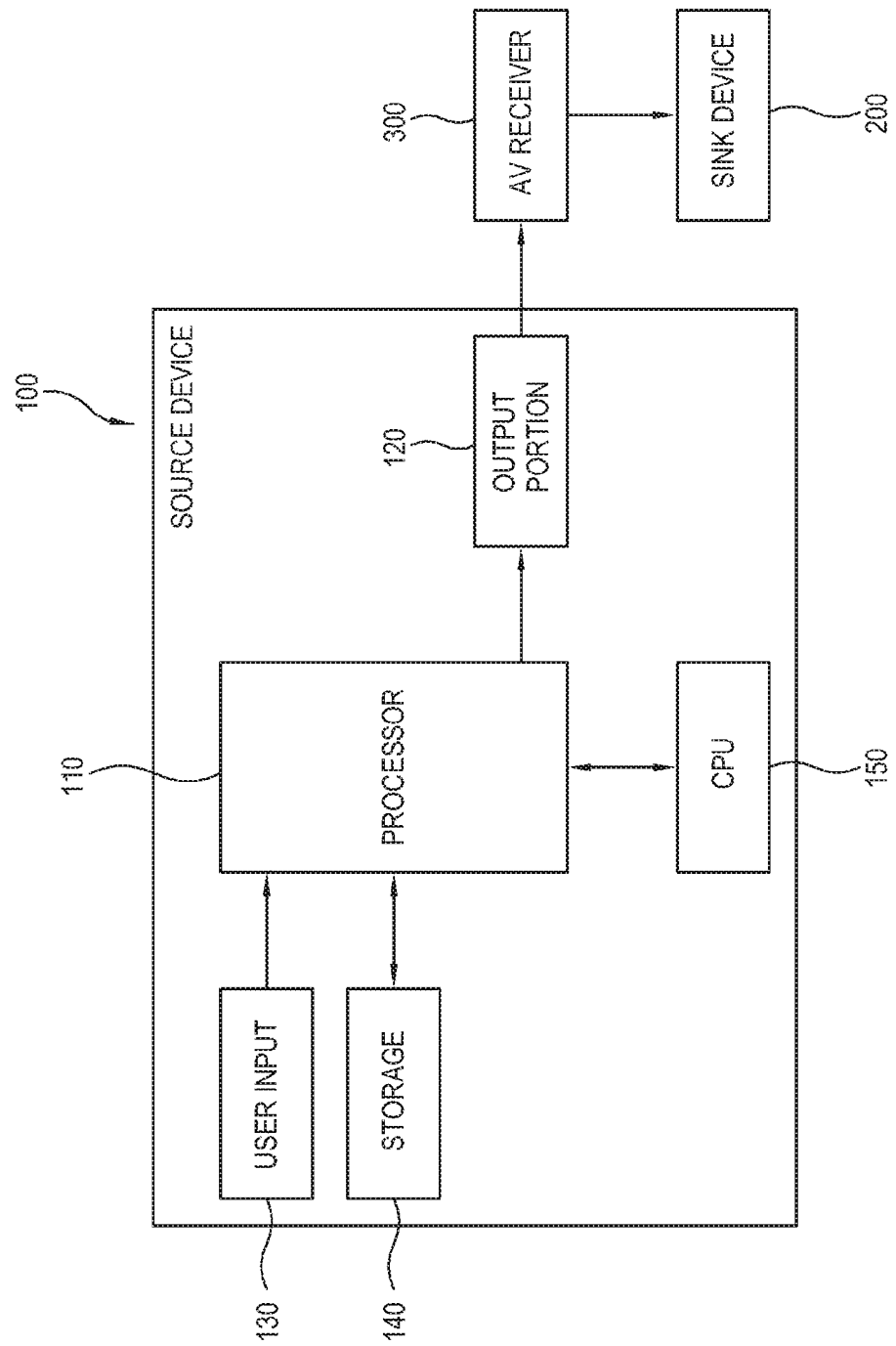
FIG. 2 is a block diagram illustrating an example source device according to the first example embodiment.

FIG. 2 is a block diagram illustrating an example source device 100 according to the first example embodiment.

As illustrated in FIG. 2, the source device 100 includes a processor 110 for processing a content signal of video content, an output portion (e.g., including output circuitry) 120 for outputting the content signal processed by the processor 110, a user input (e.g., including input circuitry) 130 for receiving a user's input, a storage 140 for storing data therein, and a central processing unit (CPU) 150 for controlling operations and processing computation in the source device 100.

In this example embodiment, the CPU 150 is provided independently of, e.g., separated from the processor 110. However, the CPU 150 may be integrated with various functional chipsets such as the processor 110 and provided in the form of a single system-on-chip (SoC). In other words, such a single SoC may involve both the processor 110 and the CPU 150.

The source device 100 and the sink device 200 are classified into the image processing apparatus for performing video-content related processes, and thus include elements having common or similar functions. In light of roles, there is a difference between the source device 100 and the sink device 200 in that the source device provides video content and the sink device 200 receives and processes the video content. In this example embodiment, the sink device 200 is configured to display an image based on video content, but not limited thereto. Alternatively, the sink device 200 may output the received video content to another device for displaying an image. In this case, the sink device 200 may serve as the source device with regard to another device.

The foregoing elements of the source device 100 schematically illustrate the basic elements of each device. It will be apparent that a power supply (not shown) or the like elements are added when the device is realized as an actual product. In this example embodiment, descriptions about matters not directly related to the present disclosure may be omitted.

Below, the elements of the source device 100 will be described in greater detail.

The processor 110 may include various processing circuitry that processes a content signal of video content stored in the storage 140 or received from the outside in accordance with preset processes under control of the CPU 150. If the source device 100 is a UHD player, the processor 110 performs various processes such as packaging, scrambling, etc. in accordance with preset multimedia interface standards so that a content signal can be output through the output portion 120.

The output portion 120 may include various circuitry that transmits a control signal processed by the processor 110 to the AV receiver 300. The output portion 120 may perform additional processes such as serializing separately from the processor 110, and may be designed to perform processes based on standards instead of the processor 110. The output portion 120 may not only send a content signal to the AV receiver 300 but also receive a control signal or the like received in the AV receiver 300 to the CPU 150. Further, the output portion 120 may serve as a communication interface to exchange a signal with various external devices (not shown) as well as the AV receiver 300.

The user input 130 may include various circuitry that sends various preset control commands or information to the CPU 150 or the processor 110 in accordance to a user's control or input. For example, the user input 130 issues various events caused by a user's control based on the user's intention to be served as a trigger for computations or operations of the CPU 150.

The storage 140 stores various pieces of data under process and control of the processor 110 or the CPU 150. The storage 140 may refer to a group of various types of storage and perform deleting and updating the data. The storage 140 includes a flash-memory, a hard-disc drive (HDD), a solid-state drive (SSD) or the like nonvolatile memory to preserve data regardless of system power of the source device 100; a read only memory (ROM) from which only data reading is allowed but updating, deleting and writing are impossible; a random access memory (RAM), a buffer or the like in which data related to computations and operations of the processor 110 and the CPU 150 is stored temporarily e.g., retained only while the system power is supplied.

Further, the storage 140 may be configured to read data of video content from an optical medium such as a Blu-ray disc.

The CPU 150 may include various processing circuitry for performing central computation to operate general elements such as the processor 110 in the source device 100, and plays a central role in basically parsing and calculating data. The CPU 150 internally includes a processor register (not shown) in which commands to be processed are stored; an arithmetic logic unit (ALU) (not shown) in charge of, for example, comparison, determination and computation; a control unit (not shown) for internally controlling the CPU 150 to analyze and carry out the commands; an internal bus (not shown); a cache (not shown); etc.

The CPU 150 performs computation needed for operating the elements of the processor 110. Alternatively, some elements of the processor 110 may be designed to operate without the data computation of the CPU 150 or operate by a separate microcontroller (not shown).

In the structure including such a source device 100, the source device 100 reproduces video content to generate a content signal and outputs the content signal to the AV receiver 300 in accordance with preset multimedia interface standards, and the AV receiver 300 relays the video content to the sink device 200 in accordance with the multimedia interface standards. Thus, the sink device 200 processes a content signal provided from the source device 100, and displays an image on a display panel (not shown) if the sink device 200 has the display panel (not shown) outputs the content signal to another display apparatus (not shown) capable of displaying an image if the sink device 200 does not have a display panel (not shown).

There are no limits to the multimedia interface standards by which the source device 100 provides a control signal to the sink device 200. For example, the multimedia interface standards may include a high definition multimedia interface (HDMI). Below, the HDMI will be described.

In the HDMI, transition minimized differential signaling (TMDS) is used in a physical layer, high-bandwidth digital content protection (HDCP) is used to encrypt a signal for content security, extended display identification data (EDID) is used for authentication between devices, and a consumer electronics control (CED) is used in connection of system control. There is a little difference between HDMI 1.4 and HDMI 2.0. For example, standards not supported in HDMI 1.4 but newly supported in HDMI 2.0 will be described below.

Figure 3:
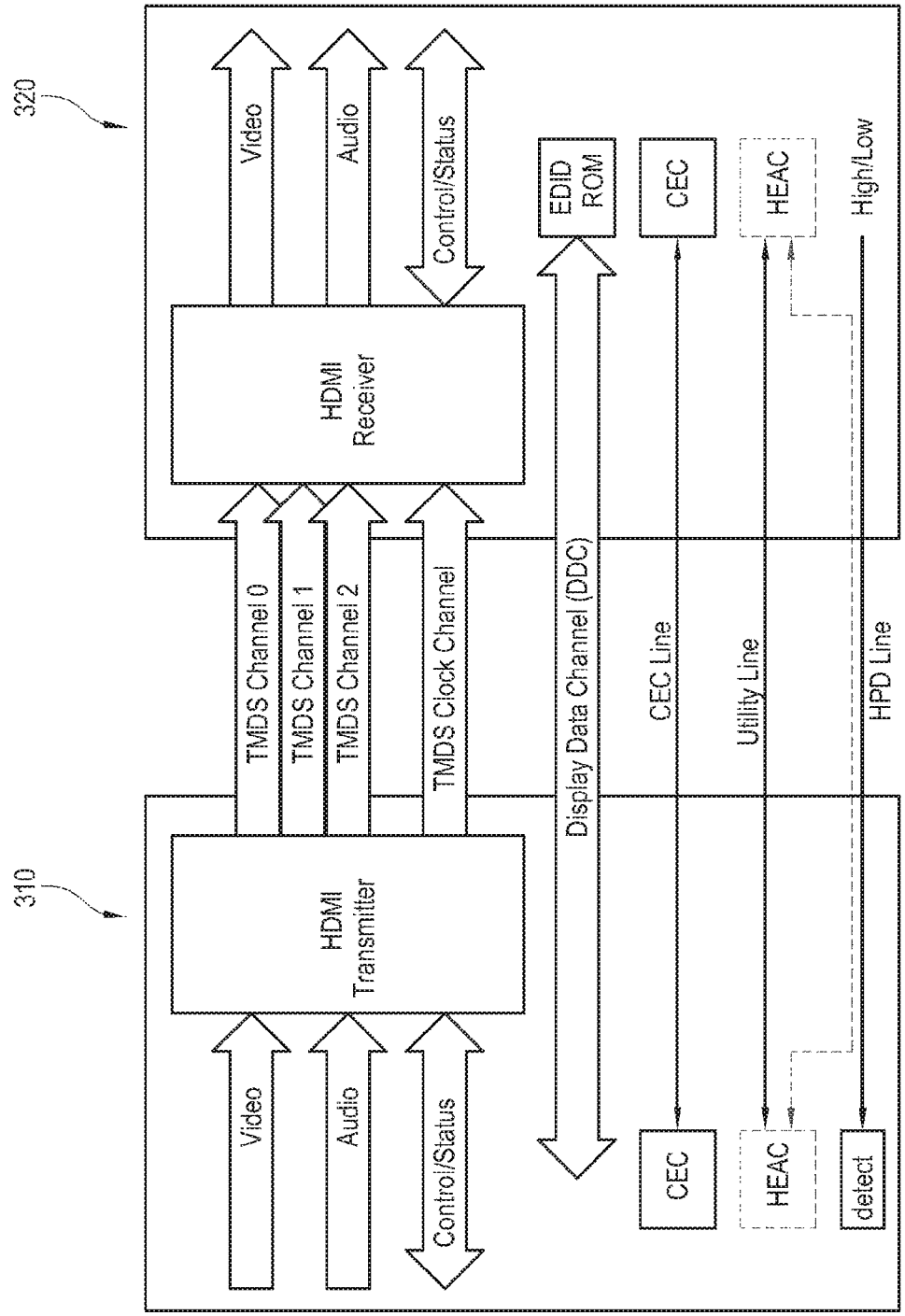
FIG. 3 is a block diagram illustrating an example high definition multimedia interface (HDMI) standard applied to the system according to the first example embodiment.

FIG. 3 is a block diagram illustrating example high definition multimedia interface (HDMI) standards applied to the system according to the first example embodiment;

As illustrated in FIG. 3, TMDS is implemented from a source device 310 to a sink device 320 through an HDMI cable in accordance with HDMI 1.4. The HDMI cable and connector form four differential pairs for TMDS data and clock channels. These channels are used in transmitting video data, audio data and auxiliary data.

Further, HDMI includes a VESA display data channel (DDC) as an I2C based communication channel. The DDC is used for exchanging environment and state information between the source device 310 and the sink device 320. Additional CEC protocols offer high-level control functions between all AV products within the system. Additional HDMI Ethernet and audio return channels (HEAC) offer Ethernet-compatible data networking between the connected devices and Audio Return Channel in reverse direction to the TMDS.

Video data, audio data and auxiliary data are transmitted through three TMDS data channels. TMDS clocks based on a video pixel rate is transmitted through a TMDS clock channel, and used as a reference frequency for data recovery in the three TMDS data channels by an HDMI receiver. In the source device 310, TMDS encoding is performed by converting 8 bits per TMDS data channel into a DC balanced, e.g., transition-minimized sequence of 10 bits, and thus serial transmission is achieved at a rate of 10 bits per TMDS clock.

Video data may have a pixel size of 24, 30, 36 or 48 bits. A default image of 24-bit color depth is transmitted at the same TMDS clock rate as the pixel clock rate. The higher the color depth, the higher the TMDS clock rate. A video format of a TMDS rate lower than 25 MHz is transmitted by a pixel-repetition scheme.

To transmit the audio data and the auxiliary data through the TMDS channel, the HDMI employs a packet structure. To achieve higher reliability for the audio data and control data, data may be transmitted as a word of 10 bits generated by a BCH error correction code and error reduction coding.

The DDC is used when the source device 310 determines the performance and characteristic of the sink device 320. The source device 310 acquires EDID recorded in the EDID ROM of the sink device 320 through the DDC, and determines a performance level of the sink device 320 in accordance with information of the acquired EDID.

The CEC connects all the source device 310 and the sink device 320 in the system to one control line. On the contrary to the DDC formed one to one between the source device 310 and the sink device 320, the CEC connects all the devices in the system and is thus utilized by way of example in controlling all the devices through one remote controller.

HDMI 2.0 is similar to HDMI 1.4, but includes some differences. HDMI 2.0 has a data transmission rate in the TMDS channel much faster than that of HDMI 1.4, and supports the maximum bandwidth of 18 Gbps. Accordingly, HDMI 2.0 supports 4K 50p/60p video transmission and multi-channel audio transmission of the maximum 32 channels. In case of HDMI 1.4, the number of maximum frames is limited to 24 at a resolution of 4096×2160 and limited to 30 at a resolution of 3820×2160. On the other hand, HDMI 2.0supports up to 60 frames at a 4K resolution.

HDMI 2.0 supports up to 1536 kHz audio sampling rate, and supports an aspect ratio of 21:9. Further, HDMI 2.0 more extends CEC than HDMI 1.4 and newly supports status and control data channel (SCDC) standards.

Like the DDC, the SCDC is an I2C based communication channel. The SCDC refers to a one-to-one communication protocol for data exchange between the source device 310 and the sink device 320. The SCDC uses the same I2C standards as HDMI 1.4 in order to read the EDID and other information. The SCDC extends I2C standards by providing a mechanism for the sink device 320 to make a request for a state check to the source device 310.

The sink device 320 including the SCDC has to include a valid HDMI forum vendor-specific data block (HF-VSDB) in the EDID, and has to set a value of SCDC_Present bit to 1. Before accessing the SCDC, the source device 310 checks whether the sink device 320 includes the valid HDMI HF-VSDB in the EDID where the value of SCDC_Present bit is set to 1. If the value of SCDC_Present bit is not 1, the source device 310 does not access the SCDC. The SCDC_Present bit for determining whether the SCDC is supported or not will be described later.

Below, standards of an image displayable in the sink device 320 will be described.

In terms of resolutions, an image is classified into standard definition (SD), full high definition (FHD) and ultra-high definition (UHD) in accordance with frame resolutions. The resolutions are high in order of the UHD, FHD and SD.

FHD has a resolution at least two times higher than SD and shows a more detailed image than an analog TV or a general DVD. FHD supports a resolution of 1920×1080, and supports progressive scanning more improved than interlace scanning.

UHD or super hi-vision (SHV) includes 4K UHD supporting a resolution of 3840×2160 and 8K UHD supporting a resolution of 7680×4320. UHD does not support the interlace scanning but supports only the progressive scanning. UHD provides that 10 bits or 12 bits are assigned per channel to represent colors.

In transferring video content from the source device to the sink device based on HDMI standards, a high transfer rate is more required for UHD video content than SD or FHD video content. In other words, HDMI 1.4 is suitable for transferring SD or FHD video content, but there may be a need of HDMI 2.0 to transfer UHD video content. Although HDMI 1.4 is capable of transferring 4K UHD video content, video content of 60 Hz is difficult for HDMI 1.4 and there is a need of HDMI 2.0.

Another point to be considered in transferring 4K UHD or higher video content is application of the HDCP.

The HDCP encrypts content to be transferred, after the HDCP devices are authenticated in the system. The authentication may be performed in the DDC and include a process of checking whether all the devices are licensed and authorized to receive content. If the authentication is successful, the source device encrypts TMDS to thereby prevent content from leaking during the transfer. Basically, the HDCP includes three sequences of authentication, encryption and destruction.

A one-to-one, e.g., point-to-point HDCP link may use only one HDCP transmitter and one HDCP receiver. Therefore, if a relay is interposed in between an HDCP transmitter and an HDCP receiver, the relay has to encrypt the content again for each HDCP receiver. If the HDCP is applied to the HDMI, the HDCP transmitter is regarded as the source device, the HDCP receiver is regarded as the sink device, and the relay is regarded as the AV receiver or repeater. The HDCP related to the relay of the HDMI will be described later.

Figure 4:
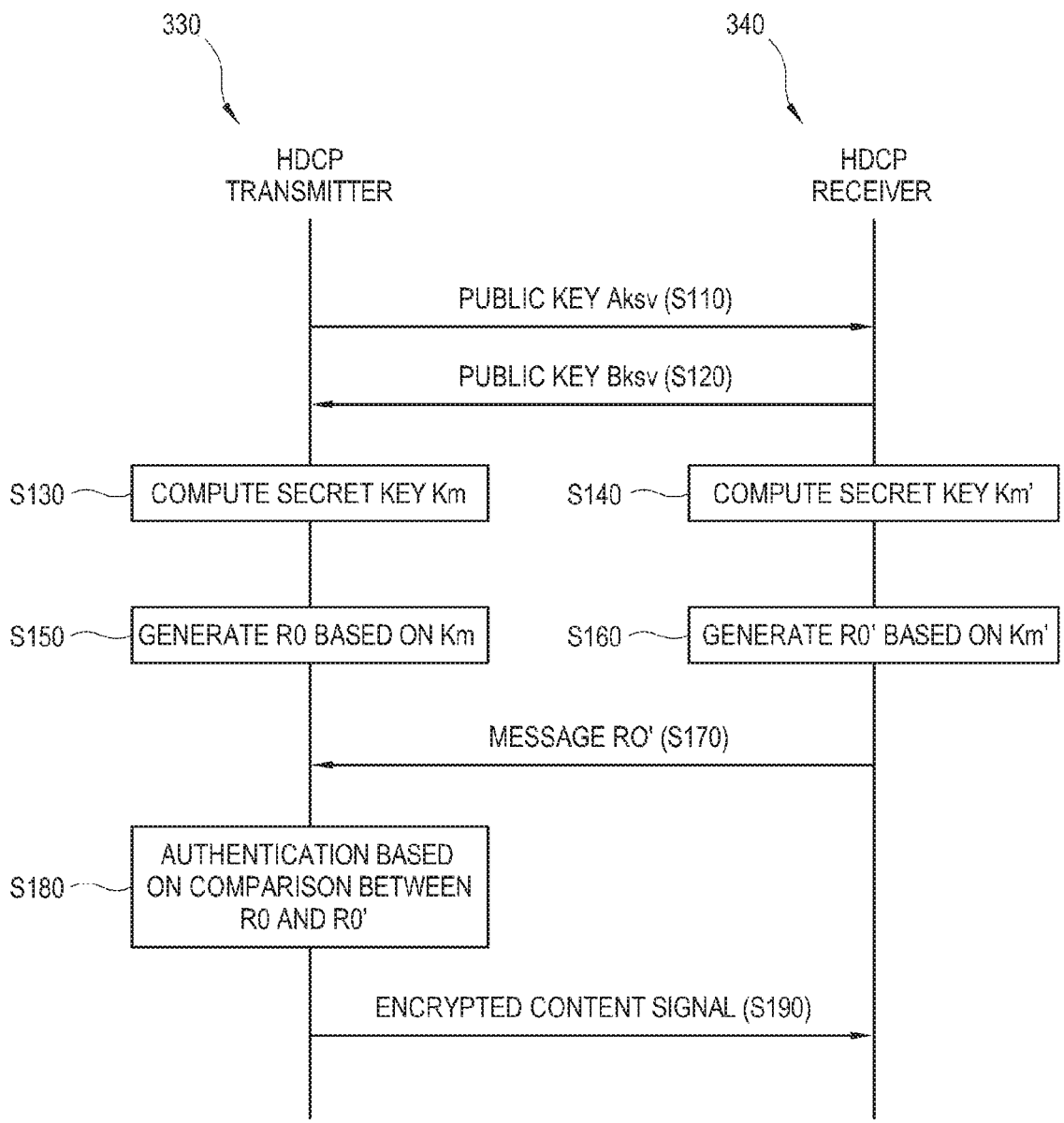
FIG. 4 is a signal flowchart illustrating example high-bandwidth digital content protection (HDCP) authentication between an HDCP transmitter and an HDCP receiver in the system according to the first example embodiment.

FIG. 4 is a signal flowchart illustrating example high-bandwidth digital content protection (HDCP) authentication between an HDCP transmitter 330 and an HDCP receiver 340 in the system according to the first example embodiment.

As illustrated in FIG. 4, the HDCP authentication is performed between the HDCP transmitter 330 and the HDCP receiver 340 in accordance with HDCP 1.x. The HDCP transmitter 330 and the HDCP receiver 340 have their own unique private keys and public keys, respectively.

At operation S110 the HDCP transmitter 330 transmits a message including a public key Aksv to the HDCP receiver 340.

At operation S120 the HDCP receiver 340 transmits a public key Bksv to the HDCP transmitter 330.

At operation S130 the HDCP transmitter 330 checks whether the public key of the HDCP receiver 340 is valid, and computes a secret key Km based on the public key and private key of the HDCP receiver 340.

At operation S140 the HDCP receiver 340 checks whether the public key of the HDCP transmitter 330 is valid, and computes a secret key Km' based on the public key and private key of the HDCP transmitter 330. The secret keys Km and Km' are respectively computed in the HDCP transmitter 330 and the HDCP receiver 340, and not transmitted through communication ports.

At operation S150 the HDCP transmitter 330 generates a message RO encrypted by the secret key Km.

At operation S160 the HDCP receiver 340 generates a message RO' encrypted by the secret key Km'.

At operation S170 the HDCP receiver 340 transmits the message RO' to the HDCP transmitter 330 before a preset period of time elapses for example, within 100 ms from time of first connection with the HDCP transmitter 330. If no message is received even after the preset period of time passes, the authentication is failed. Of course, such a specific numerical value of '100 ms' may be designed variously.

At operation S180 the HDCP transmitter 330 compares RO and RO' and performs the authentication in accordance with comparison results. If RO and RO' are matched with each other, it means that Km and Km' are also equal to each other and thus the authentication is successful. If RO and RO' are not matched with each other, it means that Km and Km' are different from each other and thus the authentication is failed.

If the authentication is successful, at operation S190 the HDCP transmitter 330 encrypts a content signal and transmits the encrypted content signal to the HDCP receiver 340. The secret key or the private key is not transmitted through an HDCP port, and only the public key Aksv or Bksv or the encrypted data traffic RO' is exposed during the transmission.

With development of HDCP 2.0 and HDCP 2.2, the authentication and other details have been also changed. Since HDCP 2.0, all interactive digital communication systems are applicable without being limited to specific interfaces such as HDMI, DVI, DisplayPort, etc. In HDCP 2.0, a location detecting function was added to an authentication protocol so that content can be transmitted to and received from only nearby devices at wireless connection. Further, ad-hoc encryption system of 56 bits was replaced by standard algorithms of an AES system of 128 bits for content encryption and an RSA system including keys of 1024 bits and 3072 bits. Further, the number of connectable devices was limited to 32.

HDCP 2.2 performs authentication in accordance with steps of authentication and key exchange (AKE), locality check and session key exchange (SKE). In the step of AKE, the public key of the HDCP receiver 340 is authenticated by the HDCP transmitter 330. In the step of locality check, the HDCP transmitter 330 makes locality of content by compelling a round trip time (RTT) in between a pair of messages not to be longer than 20 ms. In the step of SKE, the HDCP transmitter 330 exchanges a session key with the HDCP receiver 340. More specific matters are referred to HDCP 2.2 standards, and thus detailed descriptions will be omitted.

Thus, the source device authenticates the sink device in accordance with HDCP standards, encrypts a content signal, and transmits the content signal to the authenticated sink device in accordance with HDMI standards.

However, the source device does not support only one kind of video standards with respect to one piece of video content, but may selectively generate contents signals corresponding to many video standards and selectively provide a content signal. In this case, if the source device generates and provides a content signal having the highest quality or level supportable in the sink device, it will be good to a user. Below, it will be described that the source device provides a control signal corresponding to the processing ability of the sink device.

Figure 5:
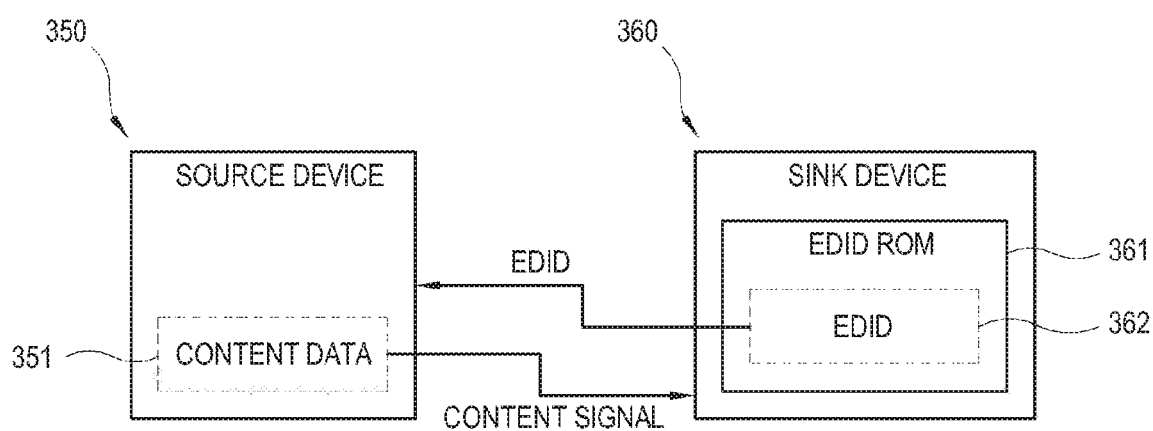
FIG. 5 is a diagram illustrating an example of a principle that the source device according to the first example embodiment transmits a content signal of a video format corresponding to processing ability of a sink device.

FIG. 5 is a diagram illustrating an example principle that a source device 350 according to the first example embodiment transmits a content signal of a video format corresponding to processing ability of a sink device 360. In this example embodiment, the source device 350 and the sink device 360 are directly connected without the AV receiver.

As illustrated in FIG. 5, the source device 350 performs HDCP authentication with respect to the sink device 360 if connection with the sink device 360 is detected. When the HDCP authentication is completed, the source device 350 accesses EDID ROM 361 of the sink device 360 through the DDC, and acquires EDID 362 recorded in an EDID ROM 361.

In this example embodiment, the HDCP authentication precedes analysis of the EDID, but not limited thereto. Alternatively, the analysis of the EDID may precede the HDCP authentication.

Besides accessing the EDID ROM 361 of the sink device 360 through the DDC, the source device 350 may make a request for the EDID 362 to the sink device 360 and the sink device 360 returns the EDID 362 of the EDID ROM 361 to the source device 350 in response to the request. Here, the request and the return may be performed using another communication channel as well as the DDC of the HDMI.

The source device 350 determines a video format supportable in the sink device 360 based on the EDID 362 acquired from the sink device 360. If the EDID analysis precedes the HDCP authentication, the HDCP authentication is performed after determining the video format.

The source device 350 processes content data 351, generates a content signal having the highest quality among the video formats supportable in the sink device 360, encrypts the content signal, and transmits the encrypted content signal to the sink device 360.

Items of information recorded in the EDID of the sink device are as follows. The EDID stored in the sink device includes information about various characteristics, environments or states of the sink device. For example, the information includes items such as the name of the sink device, the ID of the sink device, a model number, a manufactured date, a serial number, the maximum display size of an image, an aspect ratio, a horizontal frequency, a vertical frequency, the highest resolution, gamma, display power management signaling (DPMS) mode support, a supportable video mode, a manufacturer, etc. Besides, the EDID may include additional information as necessary.

When the EDID having such items is acquired from the sink device, the source device checks a "supportable video mode" among the items of the EDID. The "supportable video mode" specifies a resolution and a frequency (Hz) of a video format supportable in the sink device. The source device selects the video format having the highest quality, and generates a content signal based on the selected format. For example, if the video format having the highest level recorded in the supportable video mode of the EDID has a resolution of 2160p and a frequency of 60 Hz, the source device generates a content signal of 2160p 60 Hz.

Further, the source device may check the "maximum resolution" in the EDID. The "maximum resolution" refers to a resolution having the highest level among many video formats supportable in the sink device, which are recorded in the "supportable video mode."

In such a manner, the source device can provide video content having the highest quality among qualities supportable in the sink device.

Figure 6:
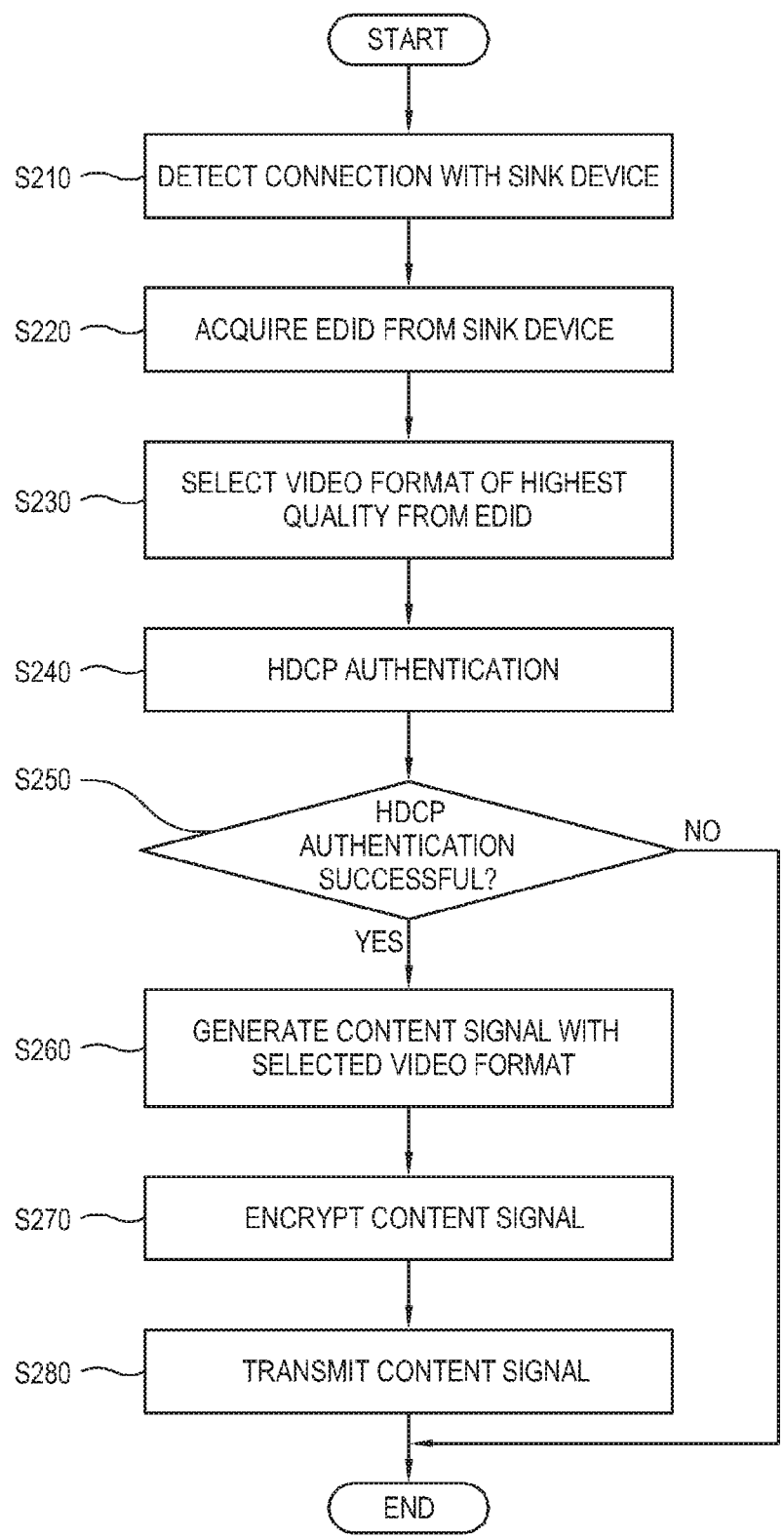
FIG. 6 is a flowchart illustrating an example of the source device according to the first example embodiment providing video content to the sink device.

FIG. 6 is a flowchart illustrating an example source device according to the first example embodiment providing video content to the sink device.

As illustrated in FIG. 6, at operation S210 the source device senses or detects connection with the sink device.

At operation S220 the source device acquires EDID from the sink device.

At operation S230 the source device selects a video format having the highest quality supportable by the sink device in the acquired EDID.

At operation S240 the source device performs the HDCP authentication with regard to the sink device. Details of the HDCP authentication are the same as described above.

At operation S250 the source device determines whether the HDCP authentication is successful. If the HDCP authentication fails, the process is stopped. On the other hand, if the HDCP authentication is successful, at operation S260 the source device generates a content signal in accordance with a selected video format. At operation S270 the source device encrypts the content signal in accordance with HDCP standards. At operation S280 the source device transmits the encrypted content signal to the sink device.

In this example embodiment, the analysis of the EDID precedes the HDCP authentication. Alternatively, the HDCP authentication may precede the analysis of the EDID.

In this example embodiment, a content signal is transferred under one-to-one connection between the source device and the sink device. However, in the system according to the HDMI standards, N-to-N connection may be possible in between a plurality of devices. To this end, a repeater used as the AV receiver may be applied to the system as illustrated in FIGS. 1 and 2.

Figure 7:
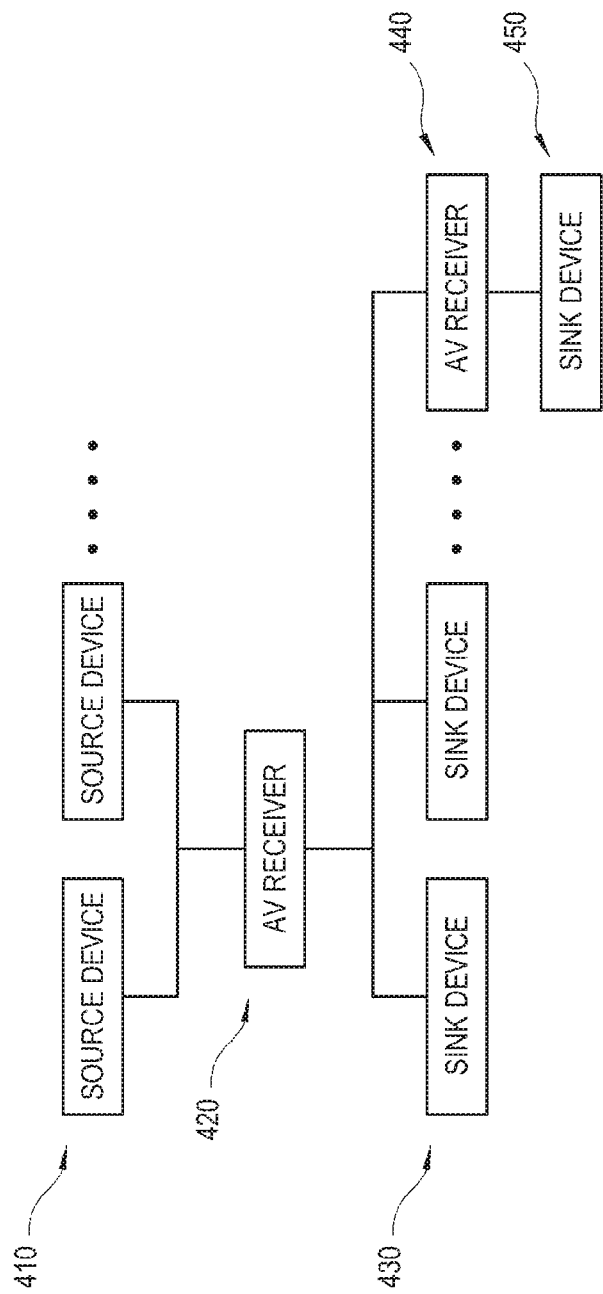
FIG. 7 is a block diagram illustrating example connections in a system according to a second example embodiment.

FIG. 7 is a block diagram illustrating example connections in a system according to a second example embodiment.

As illustrated in FIG. 7, in the system according to the second example embodiment, a plurality of source devices 410 is connected to an input terminal of an AV receiver 420. Each source device 410 may individually provide video content to the AV receiver 420.

The AV receiver 420 has an output terminal to which a plurality of sink devices 430 is connected or a separate AV receiver 440 may be connected. Such a separate AV receiver 440 also has an output terminal to which a sink device 450 is connected.

By such an N-to-N connection between the devices, the AV receiver 420 receives a plurality of pieces of video content and individually provides each video content to each sink device 430. The AV receivers 420, 440 serve as content relays in between the plurality of source devices 410 and the plurality of sink devices 430, 450. In other words, the AV receivers 420, 440 not only functions like the sink device with respect to the source device, but also functions like the source device with respect to the sink device.

During the HDCP authentication, the authentication between the AV receiver 420 and the source device 410 is performed, and the authentication between the sink device 430 and the AV receiver 440 is also performed. The AV receiver 420 processes the encrypted video content received from the source device 410, and encrypts the processed video content again to be provided to the sink device 430 and the AV receiver 440.

The AV receiver 420, 440 may be applied to various use environments. One of the most general uses is a case where both a display apparatus for displaying an image and a loudspeaker for outputting a sound are used together.

Figure 8:
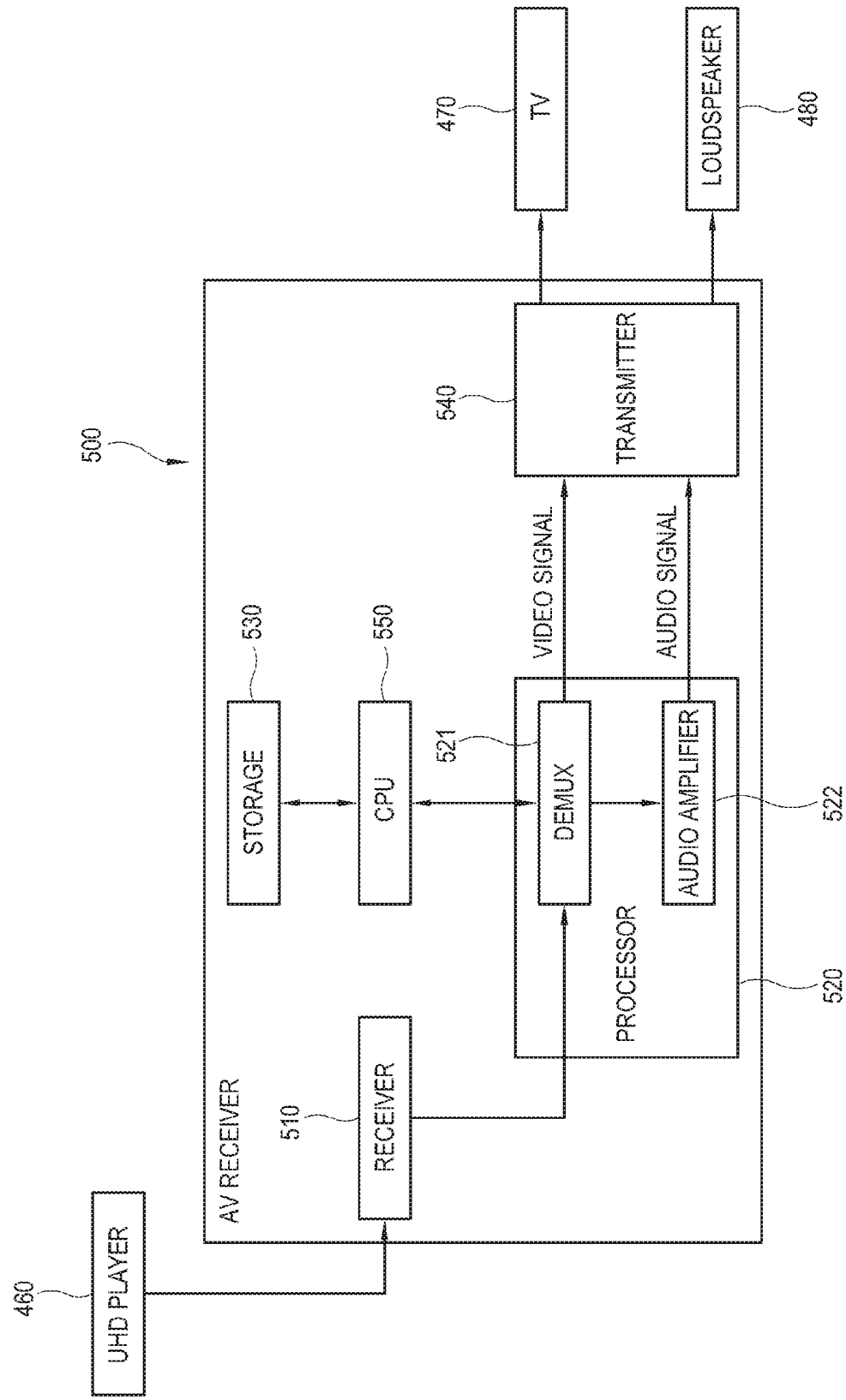
FIG. 8 is a block diagram illustrating an example principle that an AV receiver outputs signals to a TV and a loudspeaker device respectively in the system according to the second example embodiment.

FIG. 8 is a block diagram illustrating an example principle that an AV receiver 500 outputs signals to a TV 470 and a loudspeaker device 480 respectively in the system according to the second example embodiment.

As illustrated in FIG. 8, a UHD player 460 is connected to an input terminal of the AV receiver 500, and the TV 470 and the loudspeaker device 480 are connected to an output terminal of the AV receiver 500. The UHD player 460 is regarded as the source device, the TV 470 and the loudspeaker device 480 are regarded as the sink device.

In general, the TV 470 has been developed to have a larger screen and display an image with a higher resolution. However, as the TV 470 gets slimmer and more lightweight, an element for outputting a sound is likely to become inferior to an element for displaying an image. Although the TV 470 includes a loudspeaker, the loudspeaker may be inadequate to support a multichannel sound of high quality. If a user wants a high-quality sound well-matched with a high-quality image displayed on the TV 470, the loudspeaker device 480 separated from the TV 470 may be added to the system.

The AV receiver 500 includes a receiver 510 for receiving a content signal from the UHD player 460, a processor (e.g., including processing circuitry) 520 for processing the content signal, a storage 530, a transmitter 540 for outputting the processed content signal to the TV 470 and the loudspeaker device 480, and a CPU 550 for controlling operations and computations of the AV receiver 500.

If the UHD player 460, the AV receiver 500, the TV 470 and the loudspeaker device 480 are connected to one another, the HDCP authentication is performed between them. The AV receiver 500 performs the authentication with regard to the UHD player 460, and further performs the authentication with regard to each of the TV 470 and the loudspeaker device 480. During the authentication between the AV receiver 500 and the UHD player 460, the AV receiver 500 may inform the UHD player 460 that the AV receiver 500 is not the sink device but a repeater. Further, the AV receiver 500 informs the UHD player 460 that the AV receiver 500 is connecting with the TV 470 and the loudspeaker device 480. Thus, the UHD player 460 determines a connection relationship between the devices in the system.

The receiver 510 receives then encrypted content signal from the UHD player 460 and transmits it to the processor 520. The processor 520 decrypts the encrypted content signal, performs a preset process, encrypts the content signal again, and transmits the encrypted content signal to the transmitter 540.

In the processor 520, a deMUX or demultiplexer 521 performs a reverse operation of the multiplexer (not shown). That is, the deMUX 521 connects one input terminal with a plurality of output terminals, and distributes a stream input to the input terminal to the respective output terminals in accordance with selection signals. For example, if there are four output terminals with respect to one input terminal, the deMUX 521 may select each of the four output terminals by combination of selection signals having two levels of 0 and 1.

The deMUX 521 extracts a video signal and an audio signal from a content signal. There may be many methods of extracting the signals. For example, the deMUX 521 extracts a video signal and an audio signal from a content signal in accordance with packet identifier (PID) given to packets in the content signal. In the content signal, signals are independently compressed and packetized according to channels and the same PID is given to the packets corresponding to one channel so as to be distinguished from the packets corresponding to another channel. The deMUX 521 classifies the packets in the content signal according to the PID, and extracts the signals having the same PID.

In this example embodiment, the deMUX 521 demultiplexes the content signal output from the receiver 510 into a digital video signal and a digital audio signal, and sends a video signal to the transmitter 540 and sends an audio signal to an audio amplifier 522.

The audio amplifier 522 amplifies an audio signal received from the deMUX 521 and amplifies the audio signal, thereby transmitting the amplified audio signal to the transmitter 540. To this end, the audio amplifier 522 includes a pulse width modulation (PWM) processor (not shown) for outputting a PWM signal based on an audio signal, an amplifier (not shown) for amplifying the PWM signal output from the PWM processor (not shown), and an LC filter (not shown) for filtering the PWM signal amplified by the amplifier (not shown) by a predetermined frequency band to thereby demodulate the PWM signal.

The transmitter 540 receives a video signal and an audio signal from the processor 520, and transmits the video signal to the TV 470 and the audio signal to the loudspeaker device 480. Thus, an image based on video content provided by the UHD player 460 is displayed on the TV 470, while a sound based on the same video content is output through the loudspeaker device 480.

In the system where the AV receiver serves as a relay between the source device and the sink device, the source device provides a content signal having the best video format supportable in the sink device. In this case, the EDID of the sink device is used, and this will be described below.

Figure 9:
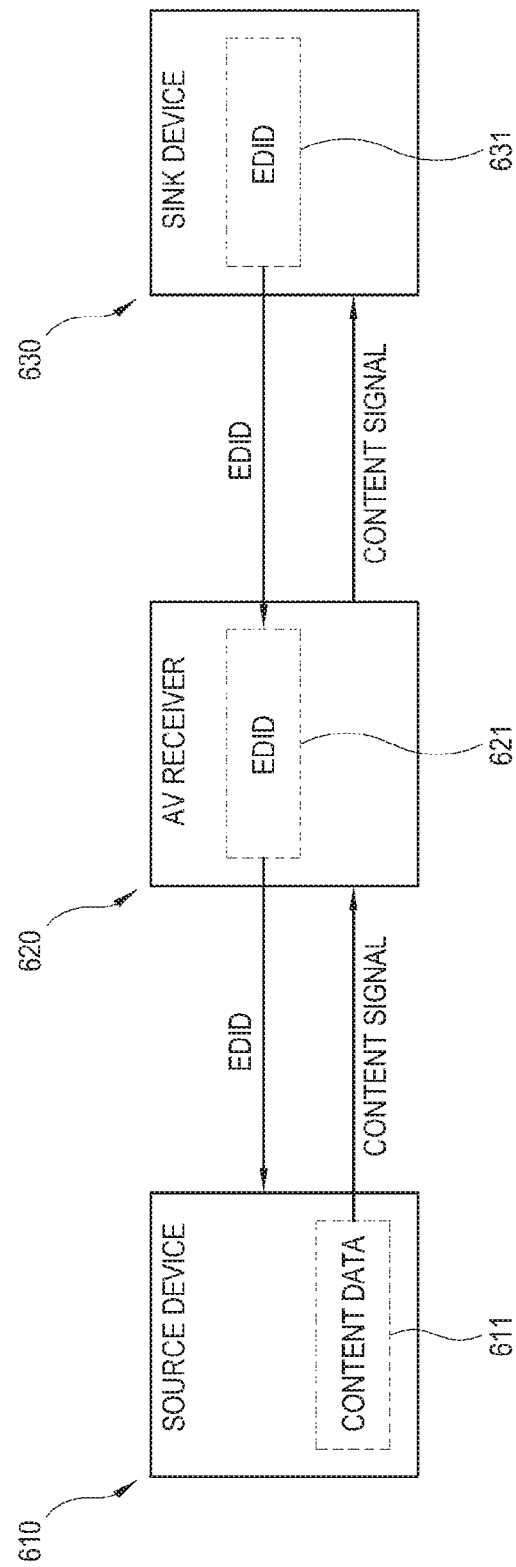
FIG. 9 is a diagram illustrating an example of a principle that a source device transmits a content signal of a video format corresponding to processing ability of a sink device in the system according to the second example embodiment.

FIG. 9 is a diagram illustrating an example principle that a source device 610 transmits a content signal of a video format corresponding to processing ability of a sink device 630 in the system according to the second example embodiment.

As illustrated in FIG. 9, a source device 610 is connected to an input terminal of an AV receiver 620, and a sink device 630 is connected to an output terminal of the AV receiver 620. That is, the source device 610, the AV receiver 620 and the sink device 630 are connected in series. As the source device 610, the AV receiver 620 and the sink device 630 are connected to one another, the HDCP authentication is performed between the source device 610 and the AV receiver 620, and the HDCP authentication is performed between the AV receiver 620 and the sink device 630. If the authentication between all the devices is completed, the source device 610 prepares for providing a content signal.

The AV receiver 620 accesses the sink device 630 and uses EDID 631 stored in the sink device 630 to thereby send information about the sink device 630 to the source device 610. For example, the AV receiver 620 accesses the sink device 630 and copies and stores the EDID 631 of the sink device 630 as EDID 421. Then, the source device 610 accesses the AV receiver 620 and acquires the EDID 631 of the sink device 630 from the AV receiver 620. However, this method is nothing but an example. Alternatively, the AV receiver 620 may be designed to change or modify the EDID 631 without copying the EDID 631 as it is.

The source device 610 determines video formats supportable in the sink device 630 based on the EDID 631 of the sink device 630 acquired from the AV receiver 620. The source device 610 generates a content signal from content data 611 in accordance with the video format of the highest quality among the determined video formats, encrypts the generated content signal, and sends the encrypted content signal to the AV receiver 620.

The AV receiver 620 decrypts and processes the content signal received from the source device 610, encrypts the content signal again and sends the encrypted content signal to the sink device 630. Thus, the sink device 630 receives video content having the best supportable video format from the source device 610 and displays an image based on the received video content.

By the way, if the source device 610 provides video content to the sink device 630 not directly but via the AV receiver 620, HDMI standard matching is required between the AV receiver 620 and the sink device 630.

For example, suppose that the sink device 630 supports a 4K UHD video format of 2160p and 60 Hz. To receive a 4K UHD image, the sink device 630 has to support HDMI 2.0 and HDCP 2.2. HDMI 1.4 has a transfer rate inadequate to transmit a content signal of a 4K UHD image, but HDMI 2.0 is suitable for transmitting a content signal of a 4K UHD image since its data transfer rate is higher than that of HDMI 1.4. Further, HDCP 2.2 is applied to the video content of the 4K UHD image in accordance with preset protocols so as to prevent content leakage.

If the source device 610 and the sink device 630 are directly connected to each other, the source device 610 acquires the EDID 631 from the sink device 630 and transmits a content signal of a 4K UHD video format based on the EDID 631 to the sink device 630.

Although the AV receiver 620 is interposed in between the source device 610 and the sink device 630, there are no problems if both the AV receiver 620 and the sink device 630 support HDMI 2.0 and HDCP 2.2. In this case, if the source device 610 transmits the content signal of the 4K UHD video format to the AV receiver 620, the AV receiver 620 processes the content signal and transmits the processed content signal to the sink device 630.

On the other hand, if the AV receiver 620 is inferior to the sink device 630 with respect to the processing ability or supports HDMI and HDCP having lower versions than those of the sink device 630, problems may arise. For instance, there may be a case where the AV receiver 620 supports HDMI 1.4 and HDCP 1.x but the sink device 630 supports HDMI 2.0 and HDCP 2.2.

In this case, the source device 610 determines that the sink device 630 is capable of displaying a 4K UHD image based on the EDID 631 of the sink device 630 acquired from the AV receiver 620. Thus, the source device 610 transmits a content signal of a 4K UHD image to the AV receiver 620. However, the AV receiver 620 cannot normally process the content signal of the 4K UHD image since is supports up to HDMI 1.4 and HDCP 1.x. Therefore, the sink device 630 receives no content signal from the AV receiver 620 and thus displays no image.

Since no image is displayed on the sink device 630, a user may think that something is wrong with the sink device 630 since the user does not know internal operations of the system. Further, if a user buys a new source device 610, the user may think that the source device 610 is out of order. However, such a situation may occur when the AV receiver 620 does not have the latest versions of the interface and security standards.

Of course, this problem may be solved if the AV receiver 620 is replaced by another one having the latest versions of the interface and security standards. However, it may be not easy for a user since the replacement of the AV receiver 620 costs money. Therefore, it is important to at least avoid the situation that the sink device 630 displays no image, without changing the system.

Below, an embodiment of solving the foregoing problem will be described.

Figure 10:
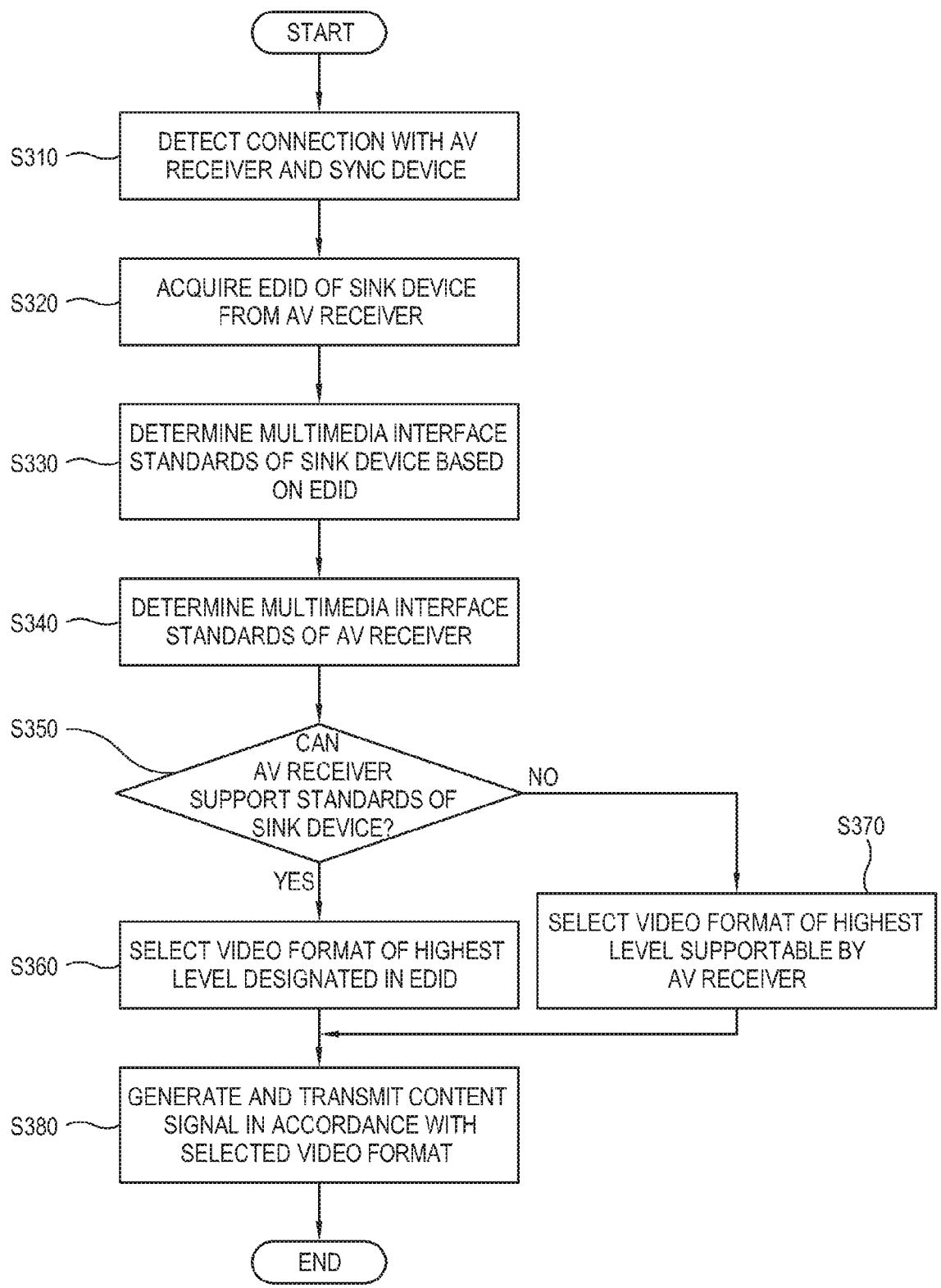
FIG. 10 is a flowchart illustrating an example source device providing a content signal in a system according to a third example embodiment.

FIG. 10 is a flowchart illustrating an example in which a source device provides a content signal in a system according to a third example embodiment.

As illustrated in FIG. 10, at operation S310 the source device detects connection with the AV receiver and the sink device.

At operation S320 the source device acquires the EDID of the sink device from the AV receiver.

At operation S330 the source device determines the multimedia interface standards of the sink device based on the acquired EDID.

At operation S340 the source device determines the multimedia interface standards of the AV receiver. A method of determining the multimedia interface standards of the AV receiver will be described later.

At operation S350 the source device determines whether the AV receiver is capable of supporting the multimedia interface standards of the sink device. If the AV receiver is capable of supporting the multimedia interface standards of the sink device, it means that the AV receiver also processes the video format having the highest level processible in the sink device. For example, the source device determines that the AV receiver is capable of supporting the multimedia interface standards of the sink device, if the multimedia interface standards of the AV receiver has a version equal to or higher than that of the sink device.

If it is determined that the AV receiver is capable of supporting the multimedia interface standards of the sink device, at operation S360 the source device determines that the previously acquired EDID is reliable, and selects a video format having the highest level supportable in the sink device as designated in the EDID.

On the other hand, if it is determined that the AV receiver is not capable of supporting the multimedia interface standards of the sink device, at operation S370 the source device determines that the previously acquired EDID is not reliable, and selects a video format having the highest level supportable in the AV receiver regardless of the EDID. Further, at operation S370 the source device may select a video format lower by a preset level than the video format having the highest level supportable in the sink device.

At operation S380 the source device generates a content signal in accordance with the selected video format and transmits the generated content signal to the AV receiver.

According to an example embodiment, the source device does not unconditionally take the EDID of the sink device acquired from the AV receiver into account, but additionally determines the processing ability of the AV receiver, thereby providing a content signal of a video format having the highest level processible by the AV receiver in accordance with the determination results.

If the AV receiver has the processing ability equal to or higher than that of the sink device, e.g., if the multimedia interface standards of the AV receiver has a version equal to or later than the multimedia interface standards of the sink device, the sink device can receive a content signal of a video format having the highest level processible by itself.

On the other hand, if the AV receiver has the processing ability lower than that of the sink device, e.g., if the multimedia interface standards of the AV receiver has a version earlier than the multimedia interface standards of the sink device, the sink device cannot avoid displaying no image even though it receives a content signal of a video format having the highest level processible by itself.

To determine the multimedia interface standards of the sink device, the source device takes the EDID into account. Below, the method that the source device determines the multimedia interface standards of the AV receiver will be described.

In this example embodiment, HDMI will be described as the multimedia interface standards, but this is nothing but an example. That is, the present disclosure is not limited to only HDMI. Further, in this embodiment, HDCP will be described as content security standards in connection with HDMI since HDCP is related to HDMI in accordance with the video formats as described above. For example, HDMI 2.0 and HDCP 2.2 have to be supported to process a video format of 4K UHD. If support of one between HDMI 2.0 and HDCP 2.2 means support of the other one, it may be determined that either of HDMI 2.0 or HDCP 2.2 is supported.

A main difference between HDMI 2.0 and HDMI 1.4 is whether SCDC is supported or not.

FIG. 11 is a diagram illustrating an example of a part of HDMI forum vendor-specific data block (HF-VSDB) 710 in HDMI 1.4 applied to a system according to a fourth example embodiment.

As illustrated in FIG. 11, HF-VSDB 710 in HDMI 1.4 includes eight bits from 0 to 7 with respect to each of bytes. In this embodiment, a part of HF-VSDB 710 is shown from the 0th bytes to the 6th bytes.

Here, the 7th bit of the 6th bytes refers to Supports_AI bit 711. If the sink device supports a function using information transmitted by audio content protection (ACP), ISRC1 and ISRC2 packets, Supports_AI bit 711 is set to '1'. Otherwise, Supports_AI bit 711 is set to '0'. The ACP packet is used by the source device to transmit information about content related to an active audio stream. The international standard recording code (ISRC) packet is an international standard code for identifying an album and music video recording defined by an international standardization organization (ISO) 3901.

For example, Supports_AI bit 711 in HDMI 1.4 is a bit for activating process of an audio signal, which is generally set to '1' if an audio process is needed.

The 7th bit of the 6th bytes in HDMI 2.0 is different in meaning from that in HDMI 1.4.

FIG. 12 is a diagram illustrating an example of a part of HF-VSDB 720 in HDMI 2.0 applied to the system according to the fourth example embodiment.

As illustrated in FIG. 12, HF-VSDB 720 in HDMI 2.0 includes eight bits from 0 to 7 with respect to each of bytes. In this example embodiment, a part of HF-VSDB 720 is shown from the 0th bytes to the 6th bytes.

The 7th bit of the 6th bytes refers to SCDC_Present bit 721. If SCDC is supported, SCDC_Present bit 721 is set to '1'. If SCDC is not supported, SCDC_Present bit 721 is set to '0'.

The address of SCDC_Present bit 721 in HDMI 2.0 is equal to the address of Supports_AI bit 711 (see FIG. 11) in HDMI 1.4. In other words, the same address has different meanings in accordance with versions of HDMI.

If the 7th bit of the 6th bytes is '1' when the source device acquires HF-VSDB from the AV receiver, the source device may incorrectly determine that the AV receiver supports HDMI 2.0 even though the AV receiver supports HDMI 1.4.

In this case, the source device performs communication with the AV receiver through the SCDC and determines whether the AV receiver supports the SCDC in accordance with responses of the AV receiver.

For example, the source device accesses a preset address of the AV receiver through SCDC. If the AV receiver supports the SCDC, the source device can acquire desired information from the corresponding address. On the other hand, if the AV receiver does not support the SCDC, the source device cannot found the address or cannot acquire desired information from the address.

Further, the source device may transmit a preset message to the AV receiver through the SCDC. If the AV receiver supports the SCDC, the source device can receive a response to the message from the AV receiver within a preset period of time. On the other hand, if the AV receiver does not support the SCDC, the source device cannot receive any response to the message from the AV receiver.

If it is determined that the AV receiver supports the SCDC, the source device determines that the AV receiver supports HDMI 2.0. Further, if it is determined that the AV receiver does not support the SCDC, the source device determines that the AV receiver supports HDMI 1.4 or earlier version.

Figure 13:
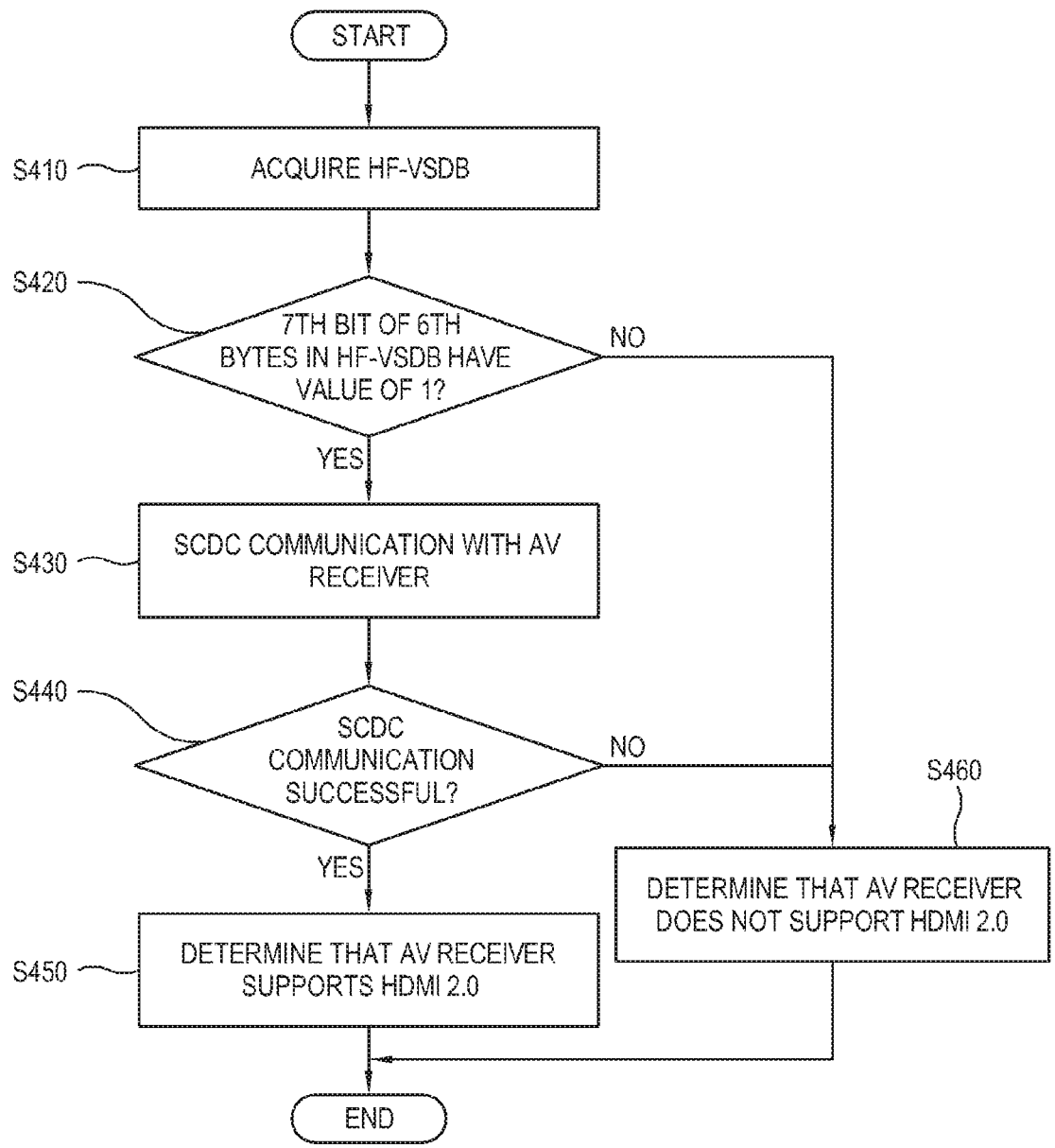
FIG. 13 is a flowchart illustrating an example of determining whether a source device according to the fourth example embodiment supports HDMI 2.0 of an AV receiver.

FIG. 13 is a flowchart illustrating an example of determining whether a source device according to the fourth example embodiment supports HDMI 2.0 of an AV receiver.

As illustrated in FIG. 13, at operation S410 the source device acquires HF-VSDB from the AV receiver.

At operation S420 the source device determines whether the 7th bit of the 6th bytes in the acquired HF-VSDB is '1'.

If it is determined that the 7th bit of the 6th bytes in the acquired HF-VSDB is '1', at operation S430 the source device performs communication with the AV receiver through the SCDC. On the other hand, if it is determined that the 7th bit of the 6th bytes in the acquired HF-VSDB is not '1', the source device moves to operation S460.

At operation S440 the source device determines whether the communication with the AV receiver through the SCDC is successful. Here, there may be various methods of determining whether the communication using the SCDC between the source device and the AV receiver is successful. For example, the source device transmits a preset command based on the SCDC to the AV receiver, and determines that the communication using the SCDC is successful if a response to the command is received within a preset period of time but determines that the communication using the SCDC is failed if a response to the command is not received within the preset period of time. Besides, the source device may determines that the communication using the SCDC is successful if information designated in the SCDC standards is acquired from the address of the AV receiver designated in the SCDC standards.

If it is determined that the communication with the AV receiver through the SCDC is successful, at operation S450 the source device determines that the AV receiver supports the SCDC and thus determines that the AV receiver supports HDMI 2.0.

On the other hand, if it is determined that the communication with the AV receiver through the SCDC is failed, at operation S460 the source device determines that the AV receiver does not support the SCDC and thus determines that the AV receiver does not support HDMI 2.0.

In this manner, the source device can determine whether or not the AV receiver supports HDMI 2.0. However, the method of determining whether the AV receiver supports HDMI 2.0 is not limited to the foregoing example embodiment.

For example, an address map having an SCDC structure supported by HDMI 2.0 designates 'Offset' for indicating an address, 'R/W' for indicating whether reading or writing is possible, and 'Name' of information recorded in each address.

The source device can access the AV receive and acquire information at an address in accordance with the address recorded in the address map of the SCDC structure. Here, the source device determines whether the AV receiver supports the SCDC and supports HDMI 2.0 based on information about Sink Version recorded in an address of 0x01, Scramber_Status recorded in an address of 0x21, or Status_Flags_ 0 and Status_Flags_ 1 recorded in addresses of 0x40 and 0x41.

FIG. 14 is a diagram illustrating an example of a field 740 of 0x01 bytes, a field 750 of 0x21 bytes and a field 760 of 0x40 and 0x41 bytes in a status and control data channel (SCDC) structure of HDMI 2.0 applied to a system according to a fifth example embodiment.

As illustrated in FIG. 14, the AV receiver playing as a role of the sink device sets a proper value for a sink version field 740 in the SCDC structure. In a relationship between the source device and the AV receiver, the AV receiver receives a content signal from the source device and therefore functions like the sink device. The source device reads this field 740 to determine the version of the sink device.

Regarding each bit in Scrambler Status Register, the AV receiver playing as the role of the sink device resets the bits to '0' when there are no power signals of +5V from the source device or when a hot plug detect (HPD) pin has a low voltage for more than 100 ms.

Scrambling_Status bit in the field 750 of 0x21 bytes is set to '1' if the AV receiver playing as the role of the sink device detects a scrambled control code sequence, but set to '0' if the AV receiver does not detect the scrambled control code sequence. The foregoing scrambling is different from encryption of the HDCP security standards and applied when the source device transmits a content signal in accordance with the HDMI standards.

Regarding each bit of Status Flags Register, the AV receiver playing as the role of the sink device resets the bit to '0' when there are no power signal of +5V from the source device or when the HPD pin has a low voltage for more than 100 ms.

Clock_Detected bit is set to '1' if the AV receiver regarded as the sink device detects a valid clock signal, but set to '0' otherwise.

Ch0_Locked bit is set to '1' if the AV receiver regarded as the sink device successfully decodes data in the HDMI 0th channel, but set to '0' otherwise.

Ch1_Locked bit is set to '1' if the AV receiver regarded as the sink device successfully decodes data in the HDMI 1st channel, but set to '0' otherwise.

Ch2_Locked bit is set to '1' if the AV receiver regarded as the sink device successfully decodes data in the HDMI 2nd channel, but set to '0' otherwise.

The source device determines that the AV receiver supports the SCDC if it is possible to access the AV receiver and acquire desired information from the address provided in the SCDC structure. Further, the source device determines that the AV receiver does not support the SCDC if it is impossible to access the address provided in the SCDC structure or acquire desired information from the address.

Thus, the source device can determine whether the AV receiver supports HDMI 2.0.

Figure 15:
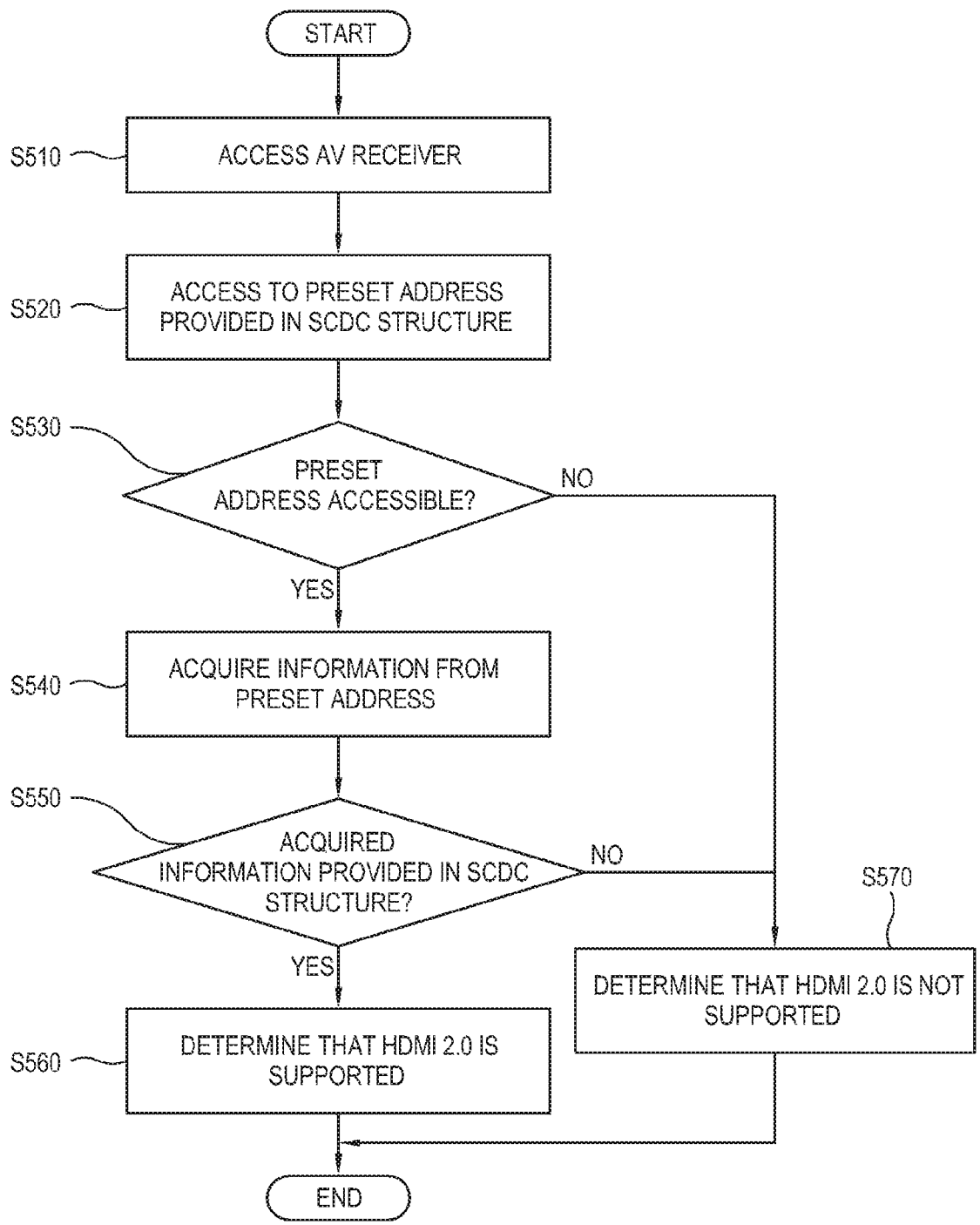
FIG. 15 is a flowchart illustrating an example of determining whether a source device according to the fifth example embodiment supports HDMI 2.0 of an AV receiver.

FIG. 15 is a flowchart illustrating an example of determining whether a source device according to the fifth example embodiment supports HDMI 2.0 of an AV receiver;

As illustrated in FIG. 15, at operation S510 the source device has an access to the AV receiver.

At operation S520 the source device accesses a preset address of the AV receiver provided in the SCDC structure. The preset address provided in the SCDC structure refers to an address expected to have information providing a basis for determining whether the SCDC is supported or not, details of which has been described as above.

At operation S530 the source device determines whether to have an access to the preset address.

If it is accessible to the preset address, at operation S540 the source device acquires information from the preset address. On the other hand, it is not accessible to the preset address, the source device moves to operation S570.

At operation S550 the source device determines whether the acquired information is provided by the SCDC structure.

If it is determined that the acquired information is provided by the SCDC structure, at operation S560 the source device determines that the AV receiver supports not only the SCDC but also HDMI 2.0.

On the other hand, if it is determined that the acquired information is not provided by the SCDC structure, at operation S570 the source device determines that the AV receiver supports neither SCDC nor HDMI 2.0.

The AV receiver has to support at least HPCP 2.2 so as to process video content of a 4K UHD video format. The AV receiver supporting HDCP 2.2 is not necessarily expected to support HDMI 2.0 since HDCP 2.2 is reasonably applied to HDMI 2.0 capable of processing 4K UHD video content. Below, a method of determining whether the AV receiver supports HDCP 2.2 will be described in detail.

FIG. 16 is a diagram illustrating an example of a part of an address map 770 applied to the HDCP according to the fifth example embodiment.

As illustrated in FIG. 16, the address map 770 applied to the HDCP includes items such as Offset to show an address of a field, Name to show a name of information recorded in each address, Size in Bytes to show the size of a field, Rd/Wr to show whether reading or writing is possible, Function to show content and functions of the information, etc. In case of Rd/Wr, Rd indicates that only reading of information is possible, and Rd/Wr indicates that both reading and writing of information are possible.

A field newly added to HDCP 2.2 is HDCP2Version recorded in an address of 0x50. When an HPD signal is sensed, the AV receiver regarded as the HDCP receiver keeps a valid value of HDCP2Version to be readable by the source device regarded as the HDCP transmitter. For example, the 2nd bit of this field shows whether the HDCP receiver supports HDCP 2.2. For instance, when this bit is set to '1', the HDCP receiver supports HDCP 2.2.

Therefore, the source device regarded as the HDCP transmitter has an access to the 2nd bit of the field having an address of 0x50 in the AV receiver regarded as the HDCP receiver, and thus determines whether the AV receiver supports HDCP 2.2.

Figure 17:
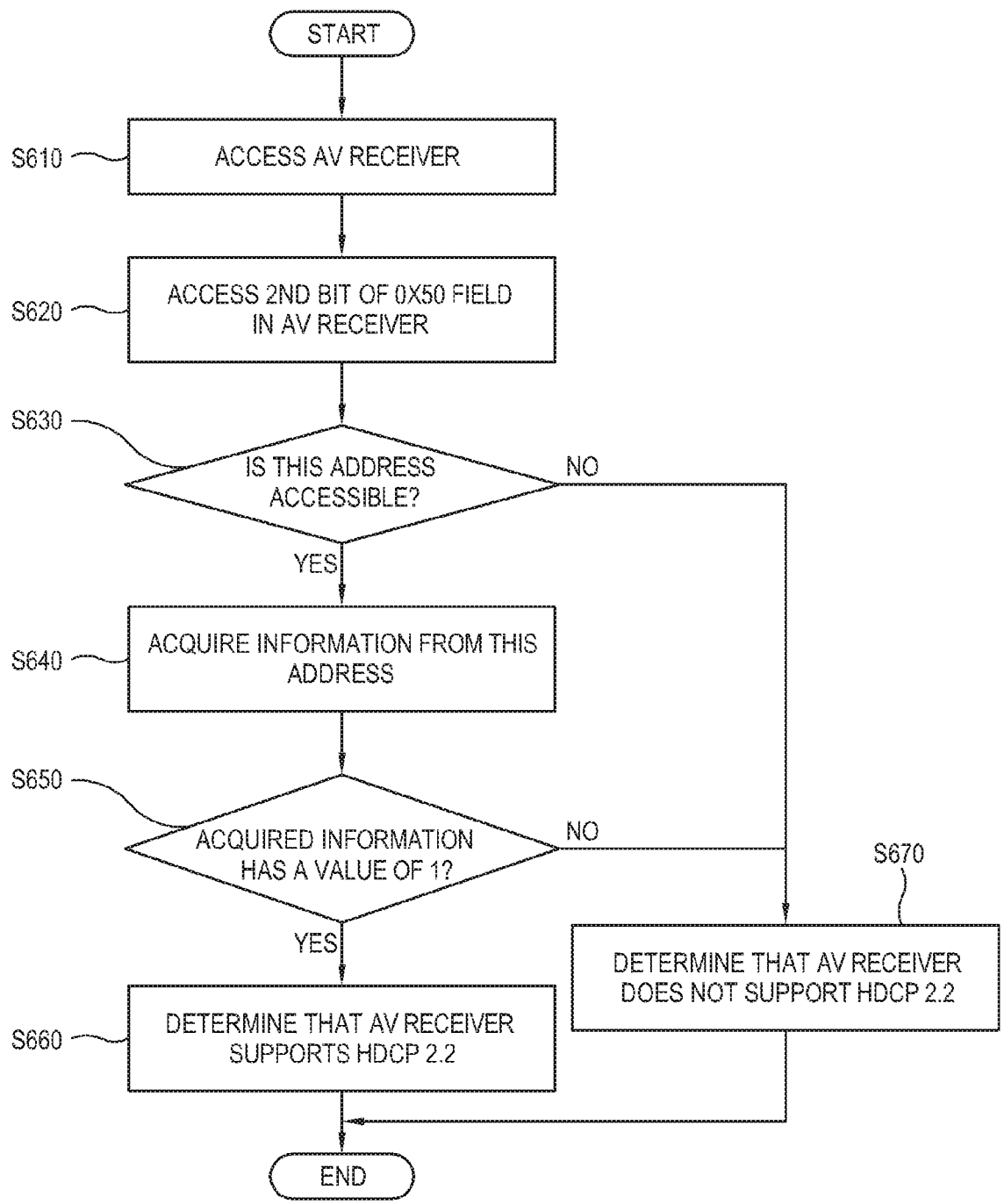
FIG. 17 is a flowchart illustrating an example of determining whether the source device according to the fifth example embodiment supports HDCP 2.2 of the AV receiver.

FIG. 17 is a flowchart illustrating an example of determining whether the source device according to the fifth example embodiment supports HDCP 2.2 of the AV receiver.

As illustrated in FIG. 17, at operation S610 the source device accesses the AV receiver.

At operation S620 the source device has an access to the 2nd bit of the field having the address of 0x50 in the AV receiver.

At operation S630 the source device determines whether it is possible to access the foregoing address of the AV receiver.

If it is possible to access that address of the AV receiver, at operation S640 the source device acquires information from that address. On the other hand, if it is impossible to access that address of the AV receiver, the source device moves to operation S670.

At operation S650 the source device determines whether the acquired information has a value of '1'.

If it is determined that the acquired information has a value of '1', at operation S660 the source device determines that the AV receiver supports HDCP 2.2. On the other hand, if it is determined that the acquired information does not have a value of '1', at operation S670 the source device determines that the AV receiver does not support HDCP 2.2.

As described above, the source device receives the EDID of the sink device from the AV receiver, and determines at least one between the multimedia interface standards and content security standards of the AV receiver, thereby determining whether the EDID is reliable in accordance with the determination results.

For example, if it is recorded in the EDID of the sink device that HDMI 2.0 and HDCP 2.2 are supported and a 4K UHD video format is processible, the source device determines whether the AV receiver supports at least one of HDMI 2.0 and HDCP 2.2 before transmitting a 4K UHD content signal to the AV receiver.

If it is determined that the AV receiver supports at least one of HDMI 2.0 and HDCP 2.2, the source device relies on the EDID and transmits a 4K UHD content signal to the AV receiver in accordance with the EDID. On the other hand, if it is determined that the AV receiver supports neither HDMI 2.0 nor HDCP 2.2, the source device does not rely on the EDID and transmits a content signal having a video format supported in HDMI 1.4, e.g., the previous version of HDMI 2.0 to the AV receiver.

Thus, the source device according to an example embodiment prevents and/or avoids a situation that the sink device displays no image, even though the AV receiver supports the standards having an older version than that of the sink device.

HDMI 2.0 is related to the multimedia interface, but HDCP 2.2 is related to security in content transfer. Strictly speaking, HDMI and HDCP are different in standards from each other. However, since both high data transfer rate and security in the transfer are required when the source device provides high resolution and high quality of video content, HDMI 2.0 and HDCP 2.2 are generally applied together in an actual product. Therefore, the source device may be configured to determine whether the AV receiver supports at least one of HDMI 2.0 and HDCP 2.2.

However, for more accurate determination, the source device may determine whether all of HDMI 2.0 and HDCP 2.2 are supported. Below, an example embodiment related to this will be described with reference to FIG. 18.

Figure 18:
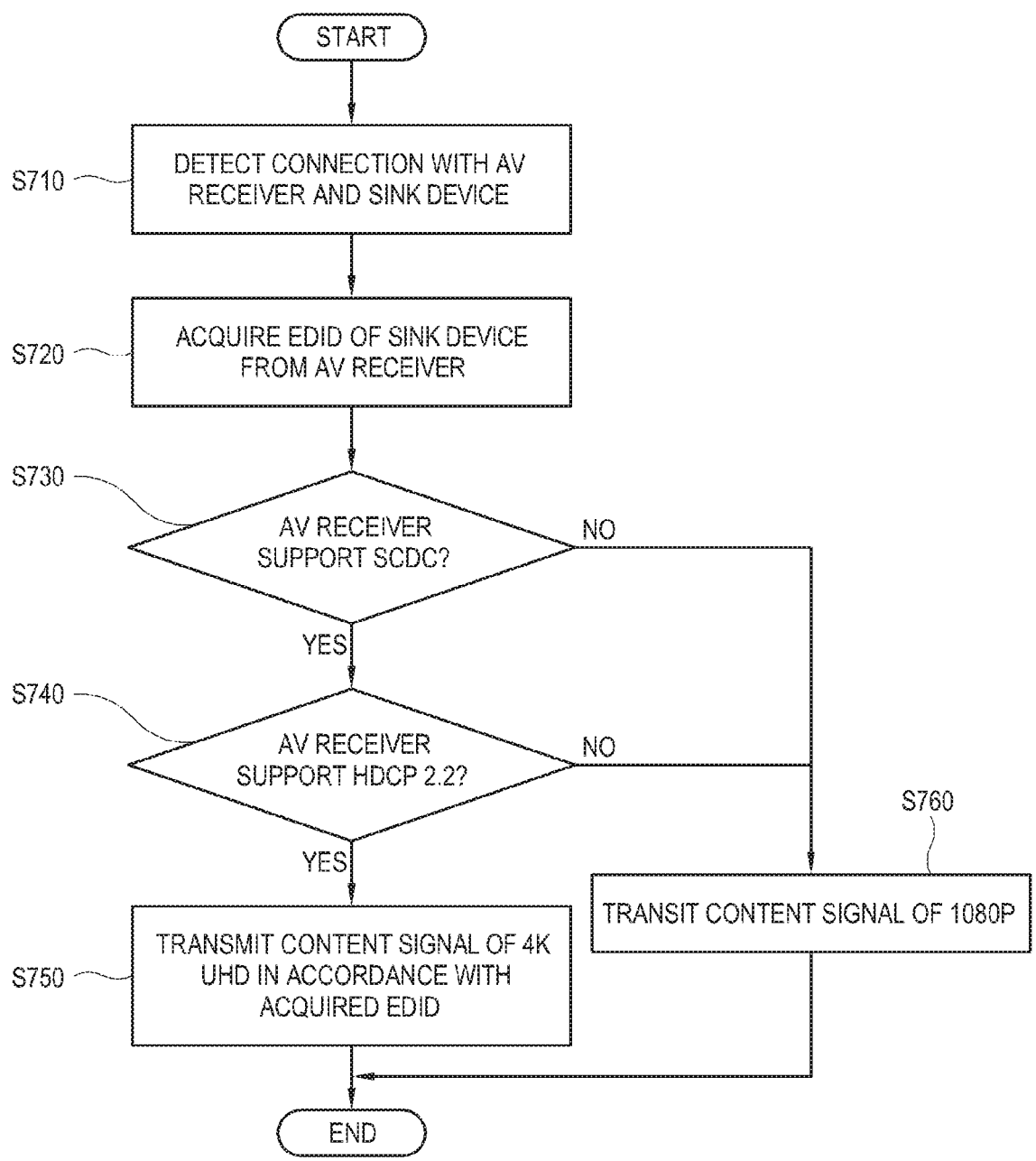
FIG. 18 is a flowchart illustrating an example in which a source device according to a sixth example embodiment provides a content signal to a sink device through an AV receiver.

FIG. 18 is a flowchart illustrates an example source device according to a sixth example embodiment providing a content signal to a sink device through an AV receiver.

As illustrated in FIG. 18, at operation S710 the source device detects connections with the AV receiver and the sink device.

At operation S720 the source device acquires the EDID of the sink device from the AV receiver. To this end, the AV receiver accesses the sink device and copies and stores the EDID from the sink device. In this embodiment, suppose that the highest resolution supportable in the EDID is 4K UHD.

At operation S730 the source device determines whether the AV receiver supports the SCDC.

If it is determined that the AV receiver supports the SCDC, at operation S740 the source device determines whether the AV receiver supports HDCP 2.2. On the other hand, if it is determined that the AV receiver does not support the SCDC, the source device moves to operation S760.

If it is determined that the AV receiver supports HDCP 2.2, at operation S750 the source device determines the acquired EDID is reliable and transmits a 4K UHD content signal to the AV receiver based on designation of the EDID. On other hand, if it is determined that the AV receiver does not support HDCP 2.2, at operation S760 the source device determines that the acquired EDID is unreliable, the source device transmits a content signal having a resolution of 1080p lower than the resolution designated in the EDID to the AV receiver.

Thus, the source device makes the sink device display an image properly with reference to the standards supported in the AV receiver. The operation S730 and the operation S740 may be exchanged with each other.

In the foregoing example embodiments, the HDMI is given as the multimedia interface standards, but not limited thereto. For example, HDCP, e.g., the security standards for the content transfer is not limited to only HDMI, and may be widely applicable to various multimedia interface standards. For example, the present disclosure may employ wired or wireless interface standards to which the HDCP is applied, or wired or wireless interface standards to which the HDCP is not applied.

Further, the security standards for the content transfer are not limited to only the HDCP.

In addition, the present disclosure may be achieved to determine only one of the content transfer security standards and the multimedia interface standards.

In the foregoing example embodiments, a content signal and a control signal are transferred between the source device and the AV receiver through a cable according to the HDMI standards. However, the present disclosure is not limited to these example embodiments, and thus another example embodiment will be described below.

Figure 19:
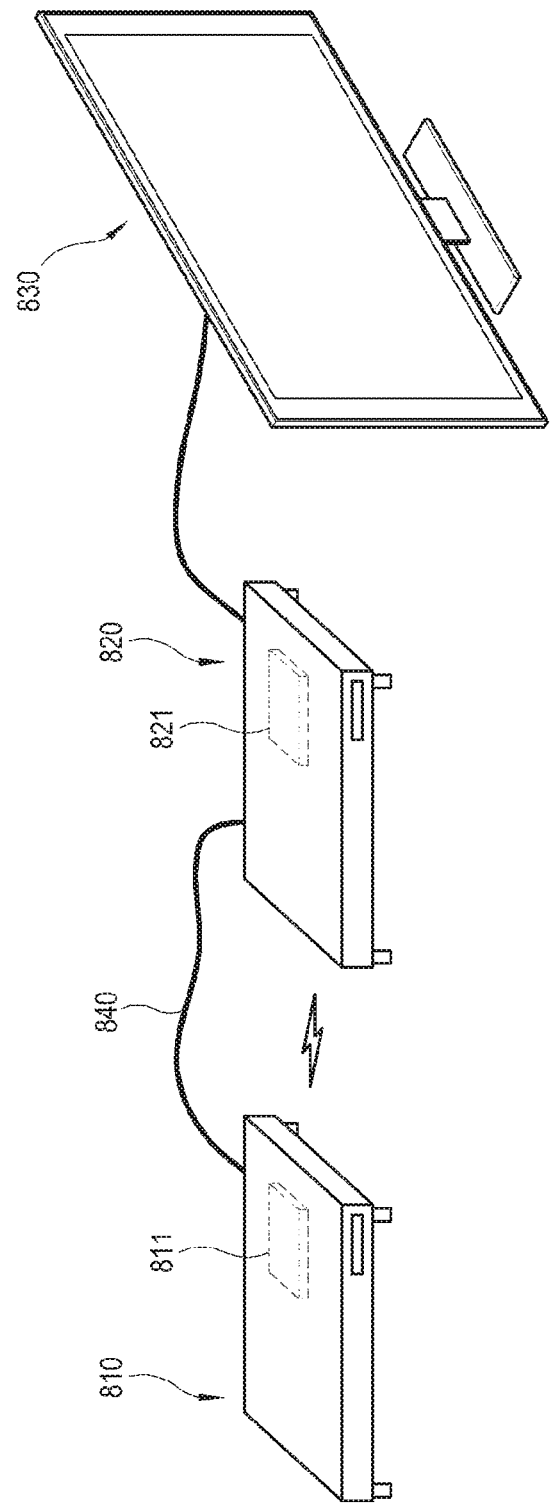
FIG. 19 is a diagram illustrating an example of a system according to a seventh example embodiment.

FIG. 19 is a diagram illustrating an example of a system according to a seventh example embodiment.

As illustrated in FIG. 19, the system according to the seventh example embodiment includes a source device 810, an AV receiver 820 and a sink device 830. Details of the source device 810, the AV receiver 820 and the sink device 830 are the same as described above, and thus repetitive descriptions will not be repeated here.

The AV receiver 820 has an input terminal for connection with the source device 810, and an output terminal for connection with the sink device 830. Here, the source device 810 is connected to the AV receiver 820 through a cable 840 and transmits general signals through the cable 840. Separately from the cable 840, the source device 810 and the AV receiver 820 may respectively use wireless communication modules 811 and 821 for wireless communication.

The source device 810 may transmit a control signal through the cable 840 according to the multimedia interface standards. As an example of the multimedia interface standards, there is the HDMI, but the multimedia interface standards are not limited to the HDMI.

The wireless communication module 811, 821 performs wireless communication corresponding to various protocols. These wireless communication protocols include wireless fidelity (Wi-Fi), Wi-Fi Direct, Bluetooth, Universal Plug And Play (UPNP), Near Field Communication (NFC), etc. The wireless communication module 811, 821 includes various communication circuitry, such as, for example, and without limitation, unit modules for communication based on protocols in accordance with support protocols.

Below, the foregoing protocols will be described schematically.

Wi-Fi refers to a protocol of supporting wireless local area network based on institute of electrical and electronics engineers (IEEE) 802.11 and personal area network (PAN)/local area network (LAN)/wide area network (WAN), etc. In an infrastructure mode, Wi-Fi provides wireless communication relayed by access points (AP) in between devices. In case of IEEE 802.11n, Wi-Fi guarantees the maximum transmission speed of 300 Mbps. The AP is connected to a router accessing an exterior WAN, and forms a hot spot of a predetermined range within an unclosed space. Each device is positioned within the hot spot around the AP and wirelessly accesses the AP, thereby connecting and communicating with a network via the AP. Here, the range of the hot spot may be expanded by additionally installing a device for amplifying a signal. However, it is not proper for a user to use Wi-Fi for the wireless communication while s/he is moving since the hot spot generally has a narrow range.

Wi-Fi Direct refers to a protocol which is based on peer-to-peer (P2P) and does not use the AP in Wi-Fi. Based on Wi-Fi Direct, the display apparatus 100 may directly connect and communicate with other devices without using the AP. Wi-Fi Direct guarantees the maximum transmission speed of 250 Mbps within a distance of 200 m between the devices.

Wi-Fi Direct utilizes a technique related to Ad-hoc among Wi-Fi techniques. An ad-hoc network is a communication network established with only mobile hosts without a stationary wired network. The ad-hoc network is suitable when it is difficult to establish the wired network or when it is used for a short time after establishing the network. The ad-hoc network has advantages that the network is quickly and inexpensively established since there is no limit to move the host and there is no need of a wired network and a base station. In the ad-hoc network, mobile nodes are used as not only hosts but also a kind of router, and multi-paths are set up with regard to other nodes or a path is dynamically set up. Wi-Fi Direct is a technique achieved to improve transmission speed and security by remedying the ad-hoc technique's shortcomings.

Wi-Fi Direct is fundamentally related to 1:1 connection, but 1:N connection is also possible. For instance, an image processing apparatus has the following processes in order to connect and communicate with the mobile device or the like external device in accordance with a Wi-Fi Direct protocol. The mobile device sends a connection request message to the image processing apparatus by a push method. If the image processing apparatus accepts the connection request of the mobile device, a pairing is completed between the image processing apparatus and the mobile device.

Bluetooth is a direct communication method between devices based on IEEE 802.15.1 standards. Bluetooth uses an industrial scientific and medical (ISM) frequency of 2400 to 2483.5 MHz. However, to prevent interference with other systems using higher and lower frequencies, Bluetooth employs total 79 channels of 2402 to 2480 MHz except a band as much as 2 MHz after 2400 MHz and a band as much as 3.5 MHz before 2483.5 MHz.

Since many systems use the same frequency band, electromagnetic interference is likely to occur between the systems. To prevent this, Bluetooth employs a frequency hopping technique. The frequency hopping technique is to transmit a packet (data) little by little while moving in many channels quickly in accordance with certain patterns. Bluetooth hops over 79 assigned channels 1600 times per second. Communication is accomplished when this hopping pattern is synchronized between Bluetooth devices. Since Bluetooth devices are connected as a master and a slave, the communication is not achieved between the two devices if the slave device is not synchronized with frequency hopping generated by the master device. Therefore, stable connection is expected without electromagnetic interferences with other systems. For reference, one master device can connect with up to seven slave devices. Here, communication between the master device and the slave device is possible, but communication between the slave devices is impossible. However, the roles of the master and the slave may be exchangeable with each other according to situations since they are not fixed.

UPNP is a protocol for connecting devices by a P2P method in accordance with digital living network alliance (DLNA). UPNP utilizes the existing protocols such as Internet protocol, tape carrier package (TCP), user datagram protocol (UDP), hypertext transfer protocol (HTTP), and extensible mark-up language (XML). UPNP is based on a wire protocol, in which information exchanged between devices is represented in the XML and communicated through the HTTP.

Wi-Fi, Bluetooth or the like protocol uses 48-bit media access control (MAC) address as a unique identifier of a communication module, whereas UPNP uses an identifier of universally unique identifier (UUID). UUID is an identifier of 16 octets, e.g., 128 bits, and is represented by 32 lowercase hexadecimal digits. UUID is a set of 32 characters or digits, represented by four hyphens, and has a total 36-digit number of "8-4-4-4-12".

NFC is one of radio-frequency identifications (RFID), which is a contactless short-range wireless communication protocol using a frequency band of 13.56 MHz. NFC is a technique to exchange data between devices at a near distance of about 10 cm, which is extended from ISO/IEC 14443. NFC operates based on electromagnetic induction between two adjacent loop antennas within a magnetic field.

NFC supports two modes of a passive communication mode and an active communication mode. In the passive communication mode, a starting device provides a carrier field, and a target device operates while modulating the provided fields. The target device of the passive communication mode acquires operation power from the electromagnetic field provided by the starting device, and thus the target device also serves as a transceiver. By the way, in the active communication mode, both the starting device and the target device communicate with each other by generating electric fields in itself. In the active communication mode, one device releases its own electromagnetic field until receiving data from an opponent, and activates its own electromagnetic field when transmitting data to the opponent.

Figure 20:
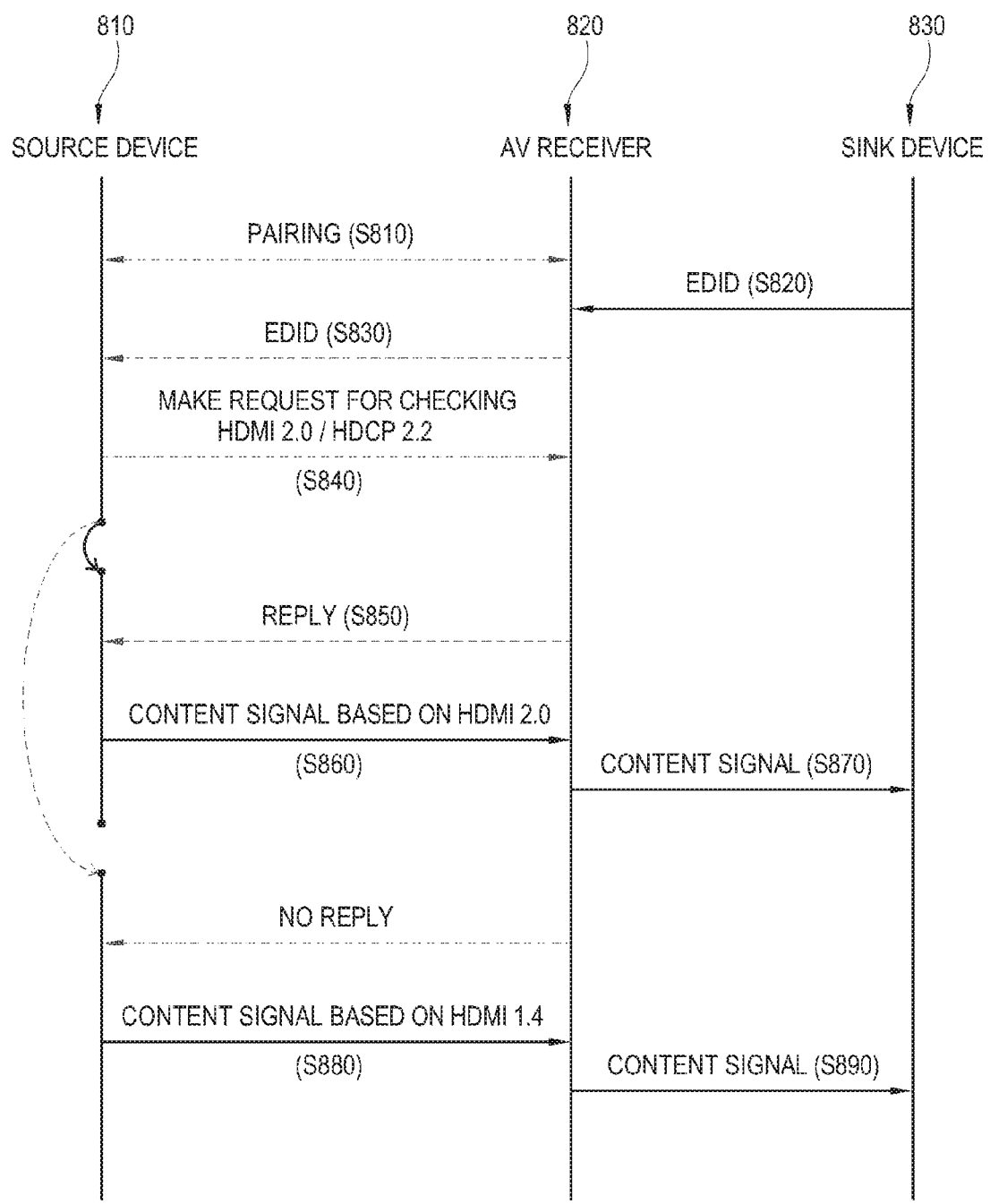
FIG. 20 is a signal flowchart illustrating an example source device providing a content signal to a sink device through an AV receiver in the system according to the seventh example embodiment.

FIG. 20 is a signal flowchart illustrating an example in which the source device 810 provides a content signal to the sink device 830 through the AV receiver 820 in the system according to the seventh example embodiment. In FIG. 20, a solid line refers to a signal transfer using a wired line, and a dotted line refers to a signal transfer through wireless communication.

As illustrated in FIG. 20, at operation S810 the source device 810 performs pairing for wireless communication with the AV receiver 820.

At operation S820 the AV receiver 820 acquires and stores EDID of the sink device 830 from the sink device 830. In this example embodiment, the AV receiver 820 and the sink device 830 are wired-connected by a cable.

At operation S830 the source device 810 acquires the EDID of the sink device 830 from the AV receiver 820 through wireless communication.

At operation S840 the source device 810 makes a request for a reply about whether the AV receiver 820 supports at least one of HDMI 2.0 and HDCP 2.2, through wireless communication.

At operation S850 the AV receiver 820 transmits the reply in response to the request from the source device 810 through the wireless communication.

For example, the source device 810 makes a preset request command based on HDCP 2.2 to the AV receiver 820, and the AV receiver 820 returns the reply to the source device 810 in response to the request. The source device 810 determines that the AV receiver supports HDCP 2.2 if the reply is received within a preset period of time.

When the reply is received from the AV receiver 820, at operation S860 the source device 810 generates a content signal in accordance with a video format designated in the EDID and transmits the content signal to the AV receiver 820 through the cable. Thus, at operation S870 the AV receiver 820 transmits this content signal to the sink device.

On the other hand, if the source device 810 receives no reply from the AV receiver 820, at operation S880 the source device 810 generates a content signal to have a video format supportable in HDMI 1.4 without referring to the video format designated in the EDID, and transmits this content signal to the AV receiver 820. Thus, at operation S890 the AV receiver 820 transmits the received content signal to the sink device.

The source device and the AV receiver may be connected by only wireless communication in accordance with design of the system, and an example embodiment related to this will be described.

Figure 21:
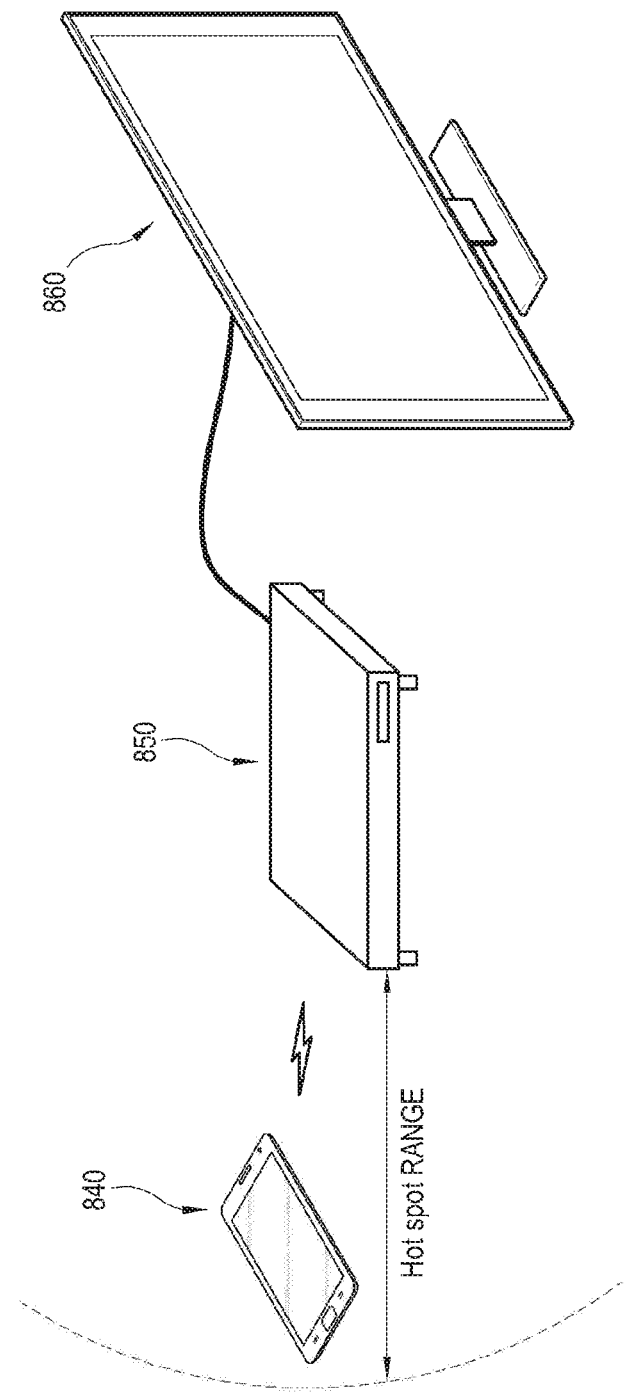
FIG. 21 is a diagram illustrating an example of a system according to an eighth example embodiment.

FIG. 21 is a diagram illustrating an example of a system according to an eighth example embodiment.

As illustrated in FIG. 21, the system according to the eighth example embodiment includes a source device 840, an AV receiver 850 and a sink device 860. Here, the AV receiver 850 and the sink device 860 are stationarily installed and used on a certain installation surface, and the sink device 860 is connected an output terminal of the AV receiver 850. On the other hand, the source device 840 is a mobile device, which is easy to be carried by a user, and wireless communication between the source device 840 and the AV receiver 850 is possible if the source device 840 enters a range of a hot spot within a preset distance from the AV receiver 850. The hot spot may be formed by the AV receiver 850 itself, or may be formed by a separate wireless communication device such as an access point (AP).

To provide a content signal to the sink device 860, the source device 840 first enters the hot spot and thus the source device 840 and the AV receiver 850 are paired for wireless communication. Then, the source device 840 acquires the EDID of the sink device 860 from the AV receiver 850 through wireless communication, and determines a video format in accordance with the multimedia interface standards of the AV receiver 850. The source device 840 generates a content signal according to the determined video format, and transmits the content signal to the AV receiver 850 through the wireless communication.

In terms of wireless communication protocols for connection between the source device 840 and the AV receiver 850, the protocol supported by the AV receiver 850 may have an older version than the protocol supported by the sink device 860. If a new protocol has a higher data transfer rate than an old protocol, the new protocol may support transmission with regard to a video format of a relatively high resolution but the old protocol may support transmission with regard to a video format of not a relatively high resolution but a relatively low resolution.

In this case, even if the EDID of the sink device 860 supports a video format of a relatively high resolution, the AV receiver 850 cannot support the video formation having such a high resolution. Thus, the source device 840 determines whether the AV receiver 850 supports the new protocol, and selectively sends the AV receiver 850 one of a content signal having a video format based on the new protocol and a content signal having a video format based on the old protocol in accordance with the determination results.

Figure 22:
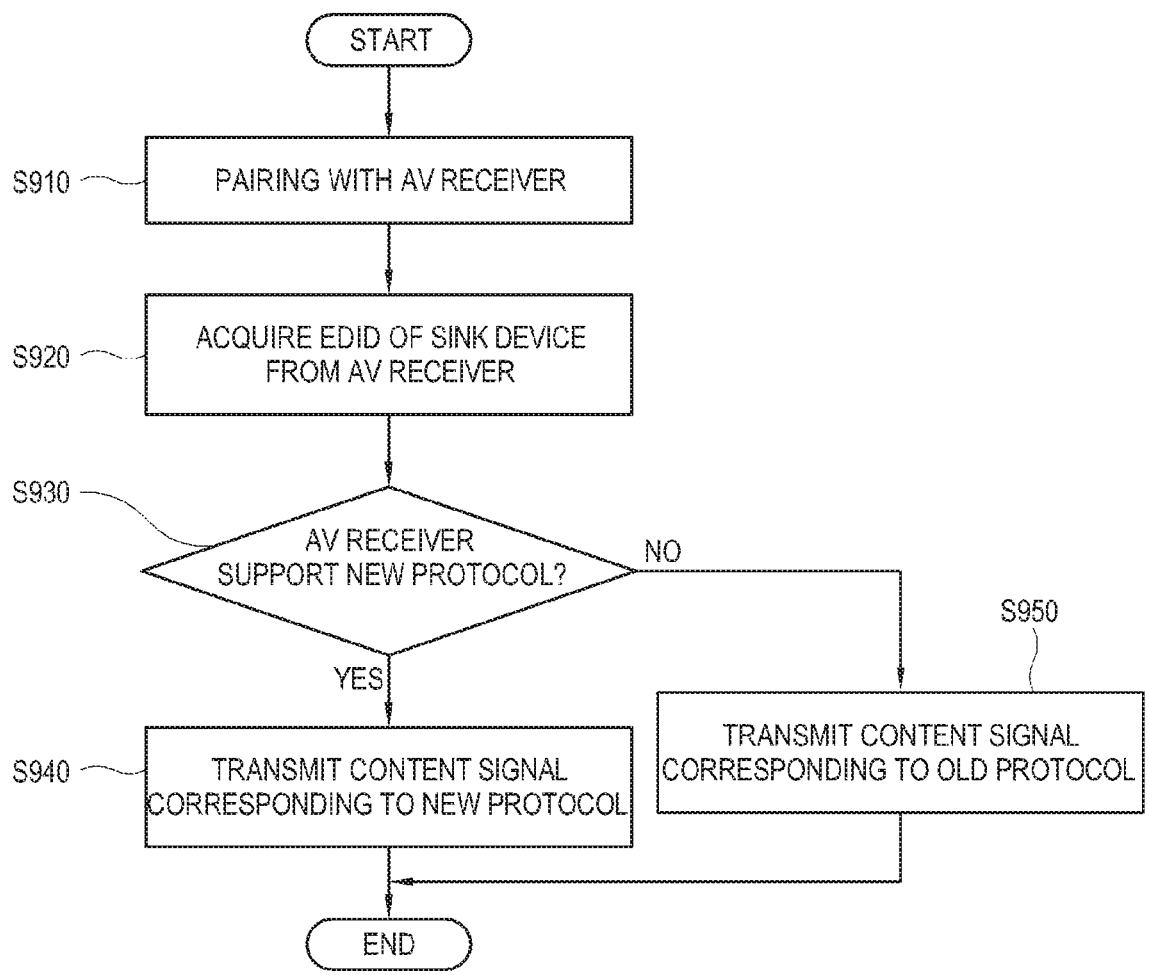
FIG. 22 is a flowchart illustrating an example source device according to the eighth example embodiment providing a content signal to a sink device through an AV receiver.

FIG. 22 is a flowchart illustrating an example source device according to the eighth example embodiment providing a content signal to a sink device through an AV receiver;

As illustrated in FIG. 22, at operation S910 the source device and the AV receiver are paired with each other. In this embodiment, not wired communication but wireless communication is performed between the source device and the AV receiver.

At operation S920 the source device receives the EDID of the sink device from the AV receiver.

At operation S930 the source device determines whether the AV receiver supports the new protocol. There are many methods of determining whether the AV receiver supports the new protocol or the old protocol. For example, the source device may send a command based on the new protocol to the AV receiver, and determine whether the AV receiver supports the new protocol, based on whether a reply to the corresponding command is received within a preset period of time.

If the AV receiver supports the new protocol, the AV receiver recognizes the command based on the new protocol and thus makes a reply to the command. On the other hand, if the AV receiver supports only the old protocol, the AV receiver does not recognize the command based on the new protocol and thus makes no reply to the command. Of course, there may be a command to recognize in the old protocol among the commands based on the new protocol, and therefore the source device may select and transmit a command supported in not the old protocol but the new protocol.

If it is determined that the AV receiver supports the new protocol, at operation S940 the source device generates a content signal having a video format corresponding to the new protocol within a range of the EDID and transmits it to the AV receiver. If 4K UHD is a video format having the highest quality and resolution among various video formats designed in the EDID, the source device selects the 4K UHD video format.

On the other hand, if it is determined that the AV receiver supports not the new protocol but only the old protocol, at operation S950 the source device generates a content signal having a video format corresponding to the old protocol without referring to the EDID, and transmits the generated content signal to the AV receiver. For example, even if the 4k UHD is a video format having the highest quality and the highest resolution among various video formats designated in the EDID, the source device may select a video format having the highest quality of 1080p among the video formats supported in the old protocol regardless of the EDID.

In the foregoing example embodiments, the source device uses the method of acquiring information by accessing the address of the AV receiver designated in specific standards or making a request for a reply to a command by sending the command based on the standards to the AV receiver, thereby determining whether the AV receiver supports the standards.

However, there are no limits to the method of determining what standards the AV receiver supports. For example, the AV receiver may also have the EDID. In this case, the source device acquires and analyzes the EDID of the AV receiver in order to determine what standards the AV receiver Supports. Below, an example embodiment related to this will be described.

Figure 23:
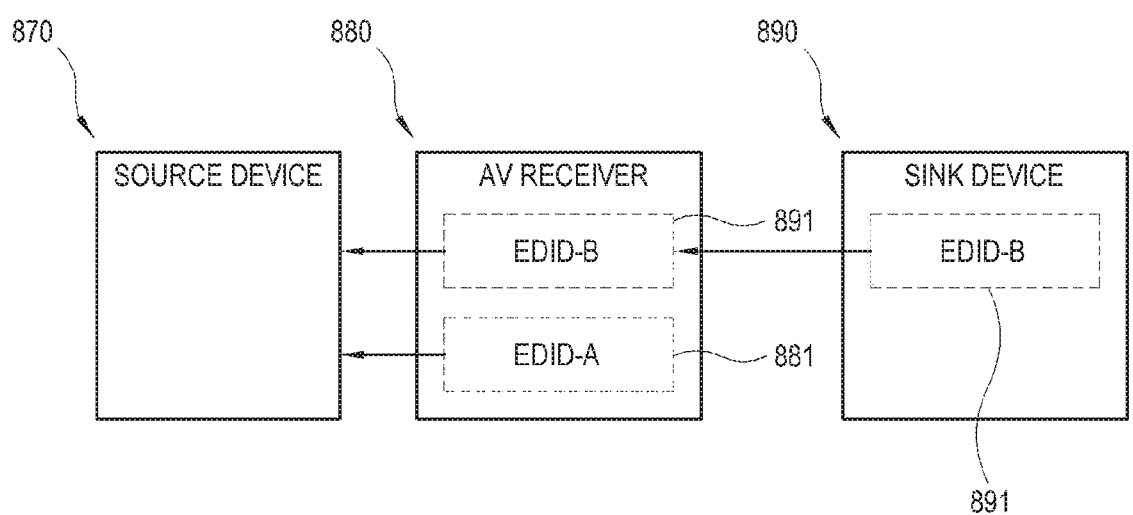
FIG. 23 is a block diagram illustrating an example principle that a source device determines support standards of an AV receiver in a system according to a ninth example embodiment.

FIG. 23 is a block diagram illustrating an example principle in which a source device 870 determines support standards supported in an AV receiver 880 in a system according to a ninth example embodiment.

As illustrated in FIG. 23, the system according to the ninth example embodiment includes a source device 870, an AV receiver 880 and a sink device 890. The AV receiver 880 has an input terminal for connection with the source device 870, and an output terminal for connection with the sink device 890.

The sink device 890 stores its own EDID, which, in this example is referred to as EDID-B 891. Further, the AV receiver 880 stores its own EDID, which, in this example, is referred to as EDID-A 881.

First, the AV receiver 880 copies and stores the EDID-B 891 from the sink device 890. The AV receiver 880 is storing its own EDID, e.g., the EDID-A 881, and the EDID of the sink device 890, e.g., the EDID-B 891 copied from the sink device 890.

Next, the source device 870 accesses the AV receiver 880 and acquires the EDID-A 881 and EDID-B 891 stored in the AV receiver 880. There are many methods of determining that the EDID-A 881 is related to the AV receiver 880 and the EDID-B 891 is related to the sink device 890. For example, the EDID generally records a name, a model number, etc. of a device, and therefore the source device 870 can determines which EDID is related to which device by analyzing the EDID-A 881 and the EDID-B 891. Alternatively, the AV receiver 880 may store the EDID-A 881 and the EDID-B 891 in previously designated addresses, and the source device 870 may determine which EDID is related to which device when the source device 870 acquires the EDID-A 881 and EDID-B 891 from the respective addresses.

The source device 870 analyzes the EDID-B 891 to determine a video format supported in the sink device 890. Further, the source device 870 analyzes the EDID-A 881 to determine versions of multimedia interface standards, content transfer security standards, etc. supported in the AV receiver 880.

Thus, the source device 870 determines the standards supported in the AV receiver 880.

Figure 24:
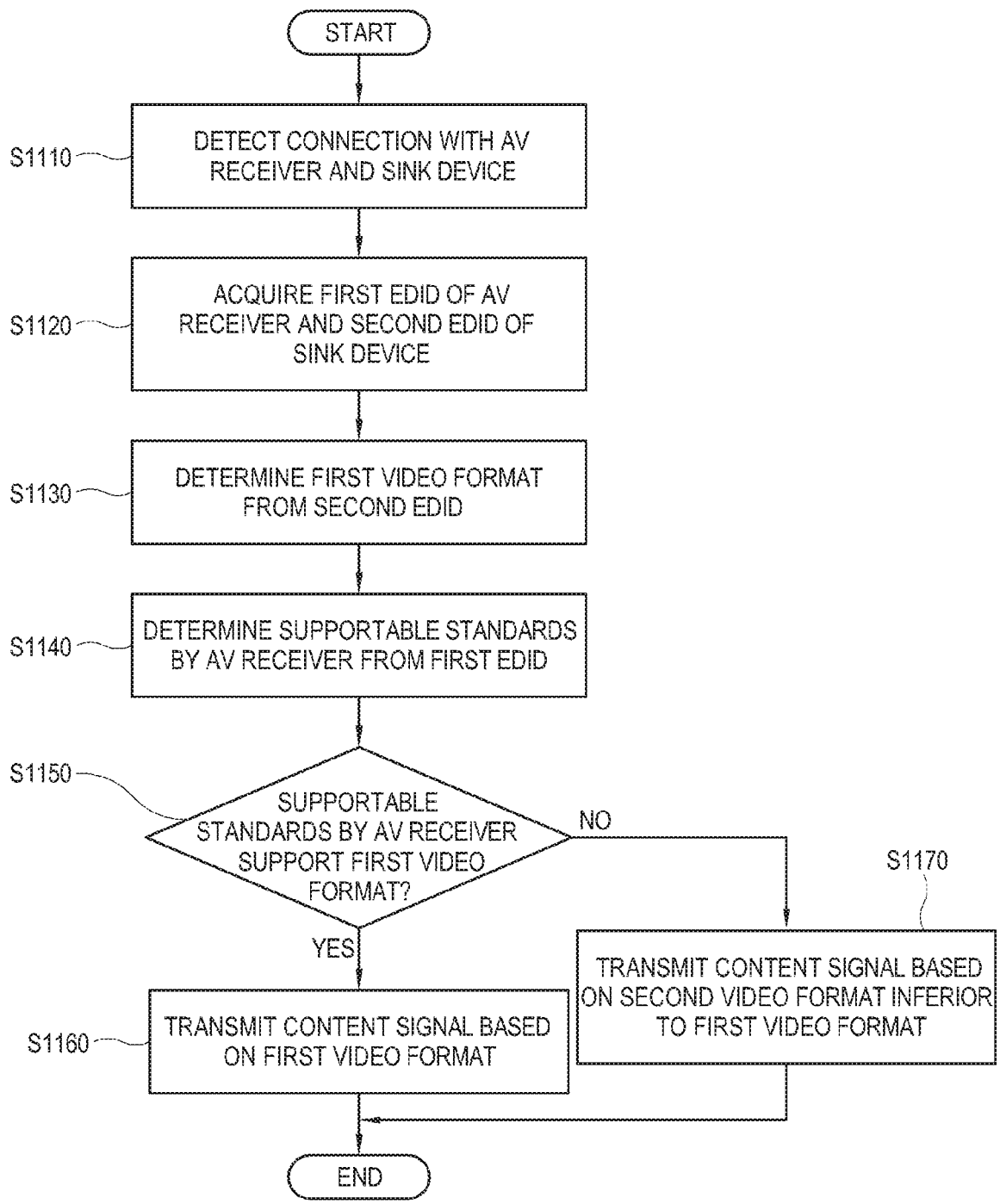
FIG. 24 is a flowchart illustrating an example source device according to the ninth example embodiment providing a content signal to a sink device through the AV receiver.

FIG. 24 is a flowchart illustrating an example source device according to the ninth example embodiment providing a content signal to a sink device through the AV receiver.

As illustrated in FIG. 24, at operation S1110 the source device detects connections with the AV receiver and the sink device.

At operation S1120 the source device acquires first EDID of the AV receiver and second EDID of sink device from the AV receiver.

At operation S1130 the source device determines a first video format having the highest level supportable in the sink device based on the second EDID of the sink device.

At operation S1140 the source device determines the standards supportable in the AV receiver based on the first EDID of the AV receiver.

At operation S1150 the source device determines whether the standards supportable in the AV receiver can support the first video format.

If the standards of the AV receiver can support the first video format, at operation S1160 the source device generates a content signal in accordance with the first video format and transmits the generated content signal to the AV receiver.

On the other hand, if the standards of the AV receiver cannot support the first video format, at operation S1170 the source device generates a content signal in accordance with the second video format supportable in the AV receiver among video formats inferior to the first video format and transmits the generated content signal to the AV receiver.

In the foregoing example embodiments, the source device controls main operations, and this may be effective when the system employs the existing AV receiver. However, the present disclosure is not limited to the foregoing example embodiments. Alternatively, the AV receiver may be configured to modify the EDID of the sink device and control the main operations instead of the source device. Below, an example embodiment related to this will be described.

Figure 25:
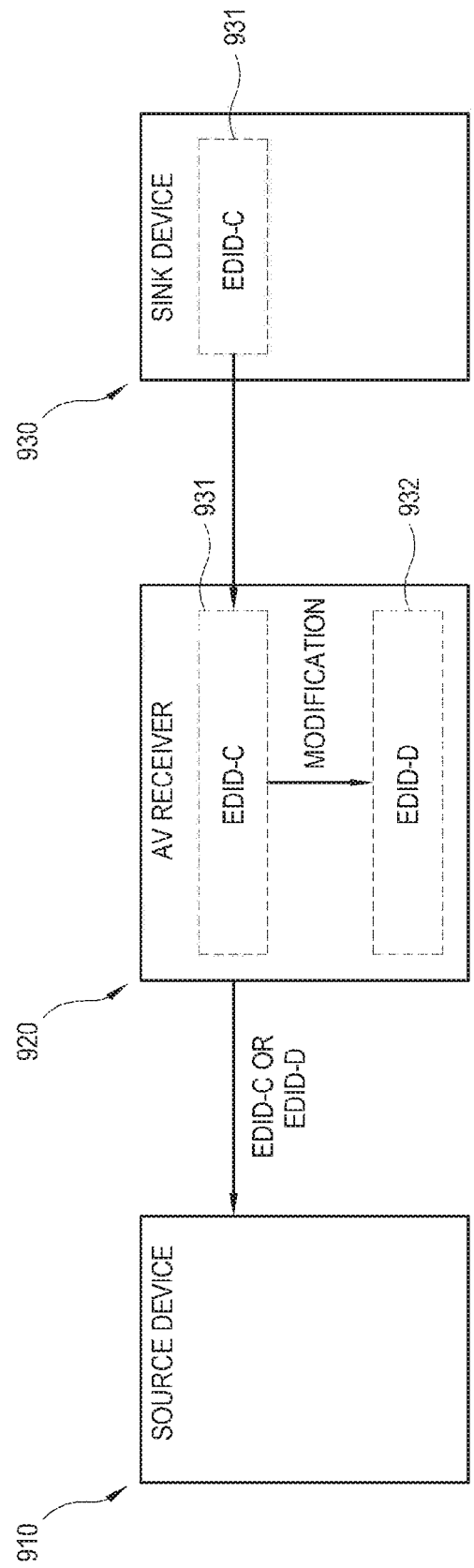
FIG. 25 is a block diagram illustrating an example principle that an AV receiver processes extended display identification data (EDID) of a sink device in a system according to a tenth example embodiment.

FIG. 25 is a block diagram illustrating an example principle in which an AV receiver 920 processes EDID of a sink device 930 in a system according to a tenth example embodiment;

As illustrated in FIG. 25, the system according to the tenth example embodiment includes a source device 910, an AV receiver 920 and a sink device 930. The source device 910 is connected to an input terminal of the AV receiver 920, and the sink device 930 is connected to an output terminal of the AV receiver 920.

The AV receiver 920 accesses the sink device 930 and acquires and stores EDID of the sink device 930, e.g., EDID-C 931. The AV receiver 920 analyzes an item of "supportable video mode" where video formats supportable by the sink device 930 are designated in the EDID-C 931.

The AV receiver 920 determines whether there is a video format not supportable by the AV receiver 920 among the video formats designated in the supportable video mode of the EDID-C 931. If all the video formats are processible in the AV receiver 920, the AV receiver 920 does not modify, but maintains the EDID-C 931.

On the other hand, if there is a video format not processible in the AV receiver 920, the AV receiver 920 deletes the corresponding video format and thus modifies the EDID-C 931 into EDID-D 932. Thus, the video formats designated in the supportable video mode of the EDID-D 932 are all processible by the AV receiver 920.

The source device 910 accesses the AV receiver 920 and acquires the EDID of the sink device 930, e.g., one of the EDID-C 931 and the EDID-D 932. The source device 910 transmits a content signal corresponding to a video format designated in the acquired EDID to the AV receiver without any additional operation.

Figure 26:
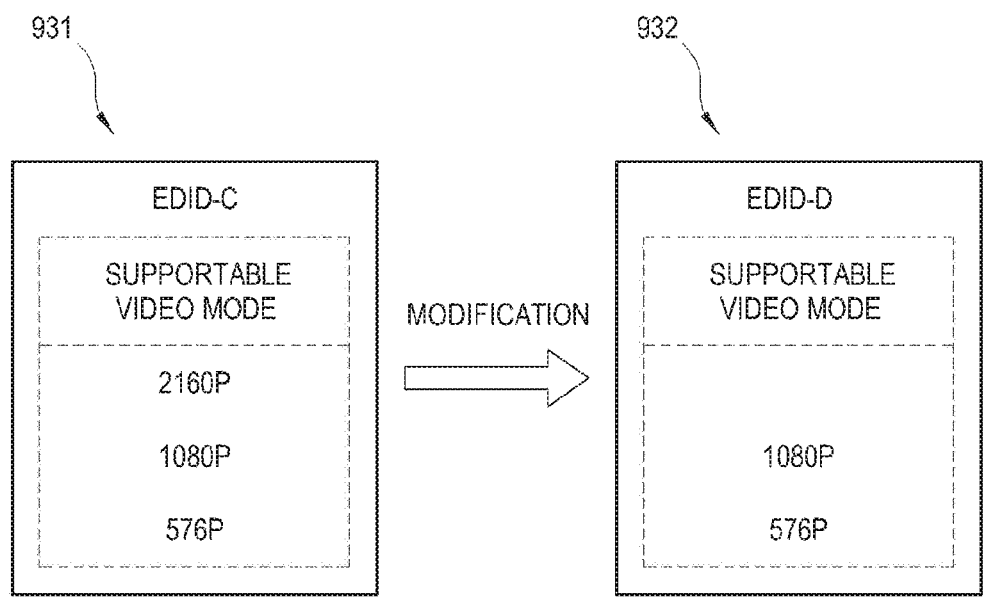
FIG. 26 is a diagram illustrating an example in which the AV receiver modifies the EDID of the sink device in the system according to the tenth example embodiment.

FIG. 26 is a diagram illustrating an example in which the AV receiver 920 modifies the EDID of the sink device 930 in the system according to the tenth example embodiment.

As illustrated in FIG. 26, the AV receiver acquires the EDID of the sink device, e.g., the EDID-C 931 from the sink device.

The AV receiver analyzes the item of the supportable video mode, where the video formats supportable by the sink device are designated, among many items of the EDID-C 931.

The supportable video mode of the EDID-C 931 may for example include resolutions of 2160p, 1080p and 576p for an image. Based on this analysis, the AV receiver determines that the resolution of 2160p, e.g., a 4k UHD image is the highest quality of the video format displayable in the sink device, and also determines that the sink device is capable of displaying an image having the resolution of 1080p or 576p.

The AV receiver determines whether there is a video format not processible by itself among the video formats designated in the supportable video mode of the EDID-C 931. For example, the AV receiver determines whether it can process the video format having the highest resolution of 2160p designated in the EDID-C 931, and maintains the EDID-C 931 without modification if it can process the video format of 2160p.

On the other hand, if it is determined that there is a video format not processible by the AV receiver among the video formats designated in the supportable video mode of the EDID-C 931, the AV receiver deletes the corresponding video format from the EDID-C 931 and thus modifies the EDID-C 931 into the EDID-D 932. For example, if the AV receiver 920 cannot process the video format having the resolution of 2160p but can process the video format having the resolution of 1080p or 576p, the AV receiver deletes the video format of 2160p among the video formats in the EDID-C 931 but maintains the video formats of 1080p and 576p.

Otherwise, the AV receiver does not modify the EDID-C 931 and does not support the SCDC or HDCP 2.2 as a condition of whether to support 4K, thereby guiding the source device not to process the video format having the resolution of 2160p.

Thus, the source device will acquire the EDID-D 932 from the AV receiver in the future. Accordingly, the source device sends the AV receiver a content signal corresponding to the video format of 1080p processible by the AV receiver instead of the video format of 2160p not processible by the AV receiver.

Figure 27:
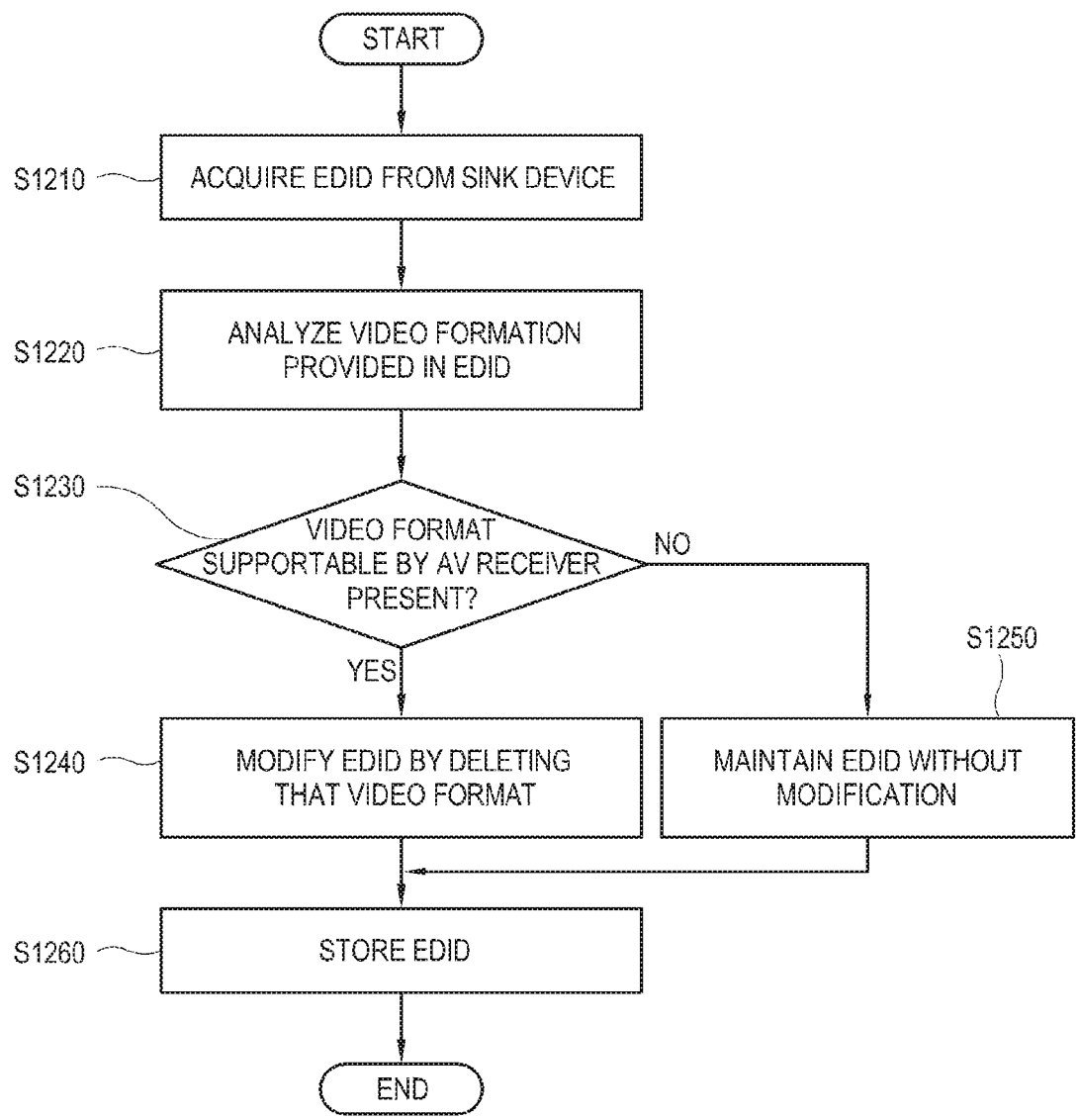
FIG. 27 is a flowchart illustrating an example in which the AV receiver according to the tenth example embodiment modifies the EDID and sends the modified EDID to the source device.

FIG. 27 is a flowchart illustrating an example AV receiver according to the tenth example embodiment modifying the EDID and sending the modified EDID to the source device.

As illustrated in FIG. 27, at operation S1210 the AV receiver acquires the EDID from the sink device.

At operation S1220 the AV receiver analyzes video formats designated in the acquired EDID.

At operation S1230 the AV receiver determines whether there is a video format not supportable by itself among the analyzed video formats.

If it is determined that there is a video format not supportable by the AV receiver among the analyzed video formats, at operation S1240 the AV receiver modifies the EDID to delete the video format not supportable by the AV receiver EDID.

On the other hand, if it is determined that all the analyzed video formats are supportable by the AV receiver, at operation S1250 the AV receiver does not modify but maintain the EDID.

At operation S1260 the AV receiver stores the EDID therein to be acquired by the source device.

Thus, the AV receiver prevents and/or avoids a content signal not processible by itself from being received from the source device.

The methods according to the foregoing example embodiments may be achieved in the form of a program command that can be implemented in various computers, and recorded in a computer readable medium. Such a computer readable medium may include a program command, a data file, a data structure or the like, or combination thereof. For example, the computer readable medium may be stored in a voltage or nonvolatile storage such as a read only memory (ROM) or the like, regardless of whether it is deletable or rewritable, for example, a RAM, a memory chip, a device or integrated circuit (IC) like memory, or an optically or magnetically recordable or machine (e.g., a computer)-readable storage medium, for example, a compact disk (CD), a digital versatile disk (DVD), a magnetic disk, a magnetic tape or the like. It will be appreciated that a memory, which can be included in a mobile terminal, is an example of the machine-readable storage medium suitable for storing a program having instructions for realizing the example embodiments. The program command recorded in this storage medium may be specially designed and configured according to the example embodiments, or may be publicly known and available to those skilled in the art of computer software.

Although various embodiments have been illustrated and described, it will be appreciated by those skilled in the art that changes may be made in these example embodiments without departing from the principles and spirit of the disclosure, the scope of which is defined in the appended claims and their equivalents.

What is claimed is:

1. An electronic apparatus comprising:
   output circuitry configured to connect to an external apparatus; and
   a processor configured to:
      receive, from the external apparatus via the output circuitry, information indicating a first video format supported by the display apparatus,
      based on identifying that the external apparatus supports an interface standard for transmitting a signal formatted in the first video format, output via the output circuitry a first content signal formatted in the first video format to the external apparatus, and
      based on identifying that the external apparatus does not support the interface standard, output via the output circuitry a second content signal formatted in a second video format different from the first video format to the external apparatus such that the external apparatus transmits the second content signal to the display apparatus.

2. The electronic apparatus according to claim 1, wherein the first video format and the second video format are different in image quality from one another.

3. The electronic apparatus according to claim 2, wherein the image quality is based on at least one or more of a resolution and a frame rate.

4. The electronic apparatus according to claim 1, wherein the processor is configured to control to transmit a command based on the interface standard to the external apparatus, and to identify that the external apparatus supports the interface standard based on a reply to the command being received from the external apparatus within a predetermined period of time, and to identify that the external apparatus does not support the interface standard based on a reply to the command not being received from the external apparatus within the predetermined period of time.

5. The electronic apparatus according to claim 1, wherein the processor is configured to control to access a preset address designated in the interface standard of the external apparatus to identify whether data designated corresponding to the address is acquirable, and to identify that the external apparatus supports the interface standard based on the data being acquirable, and to identify that the external apparatus does not support the interface standard based on the data not being acquirable.

6. The electronic apparatus according to claim 1, wherein the interface standard comprises high definition multimedia interface (HDMI) 2.0.

7. The electronic apparatus according to claim 6, wherein the processor is configured to identify that the external apparatus supports HDMI 2.0 based on the external apparatus being capable of performing communication using a status and control data channel (SCDC), and to identify that the external apparatus does not support HDMI 2.0 based on the external apparatus not being capable of performing communication using the SCDC.

8. The electronic apparatus according to claim 1, wherein the interface standard comprises high-bandwidth digital content protection (HDCP) 2.2.

9. The electronic apparatus according to claim 1, wherein the processor is configured to control to communicate with the external apparatus through a cable for connecting the output circuitry and the external apparatus.

10. The electronic apparatus according to claim 1, wherein the output circuitry is configured for wireless communication with the external apparatus, and
    the processor is configured to control to wirelessly communicate with the external apparatus through the output circuitry.

11. The electronic apparatus according to claim 1, wherein the information comprises extended display identification data (EDID) of the display apparatus stored in the external apparatus, and the processor is configured to control to acquire the EDID from the external apparatus.

12. A method of controlling an electronic apparatus, the method comprising:

receiving information indicating a first video format supported by a display apparatus from an external apparatus;

based on identifying that the external apparatus supports an interface standard for transmitting a signal formatted in the first video format, outputting a first content signal formatted in the first video format to the external apparatus; and based on identifying that the external apparatus does not support the interface standard, outputting a second content signal formatted in a second video format different from the first video format to the external apparatus such that the external apparatus transmit the second content signal to the display apparatus.

13. A system comprising:

an electronic apparatus configured to provide a content signal;

a display apparatus configured to display an image based on the content signal; and an external apparatus, wherein the electronic apparatus comprises:

output circuitry configured to connect to the external apparatus;

a processor configured to:

receive, from the electronic apparatus via the output circuitry, information indicating a first video format supported by the display apparatus, based on identifying that the external apparatus supports an interface standard for transmitting a signal formatted in the first video format, output via the output circuitry a first content signal formatted in the first video format to the external apparatus, and based on identifying that the external apparatus does not support the interface standard, output via the output circuitry a second content signal formatted in a second video format different from the first video format to the external apparatus such that the external apparatus transmits the second content signal to the display apparatus.

14. The system according to claim 13, wherein the processor is configured to control to output the first content signal based on identifying that the external apparatus supports the first video format.

15. The system according to claim 13, wherein the external apparatus is configured to store the information received from the display apparatus, and to transmit the stored information to the electronic apparatus.

16. An electronic apparatus for transmitting a content signal to an external apparatus, the electronic apparatus comprising:

interface circuitry configured to connect with the external apparatus; and a processor configured to:

obtain, via the interface circuitry from the external apparatus, first information indicating a first video format supported by the display apparatus, obtain, via the interface circuitry from the external apparatus, second information, based on the second information indicating that the external apparatus supports an interface standard for a signal to be outputted in the first video format supported by the display apparatus according to the first information, output via the interface circuitry a first content signal formatted in the first video format to the external apparatus, and based on the second information indicating that the external apparatus does not support the interface standard, output via the interface circuitry a second content signal formatted in a second video format different from the first video format to the external apparatus.

17. The electronic apparatus according to claim 16, wherein, based on the second information indicating that the external apparatus supports a second interface standard for a signal to be outputted in the second video format, the processor is configured to output via the output circuitry the second content signal to the external apparatus.

18. The electronic apparatus according to claim 16, wherein the external apparatus comprises a relay, and the first video format and the second video format are different in image quality from one another.

19. The electronic apparatus according to claim 18, wherein the interface standard comprises high definition multimedia interface (HDMI) 2.0.

20. The electronic apparatus according to claim 19, wherein the processor is configured to identify that the external apparatus supports HDMI 2.0 based on the external apparatus being capable of performing communication using a status and control data channel (SCDC), and to identify that the external apparatus does not support HDMI 2.0 based on the external apparatus not being capable of performing communication using the SCDC.

21. The electronic apparatus according to claim 16, wherein the interface standard comprises high-bandwidth digital content protection (HDCP) 2.2.

22. The electronic apparatus according to claim 16, wherein the processor is configured to control to communicate with the external apparatus through a cable for connecting the interface circuitry and the external apparatus.

23. The electronic apparatus according to claim 16, wherein the first information comprises extended display identification data (EDID) of the display apparatus stored in the external apparatus, and the processor is configured to control to acquire the EDID from the external apparatus.

* * * * *